(12) United States Patent
Burbidge et al.

(10) Patent No.: US 11,546,809 B2
(45) Date of Patent: *Jan. 3, 2023

(54) METHOD FOR ACCESSING A SERVICE UNAVAILABLE THROUGH A NETWORK CELL

(71) Applicant: BlackBerry Limited, Waterloo (CA)

(72) Inventors: Richard Charles Burbidge, Swindon (GB); Takashi Suzuki, Ichikawa (JP); David Philip Hole, Southampton (GB); Johanna Lisa Dwyer, Brookline, MA (US); Venkata Ratnakar Rao Rayavarapu, Bangalore (IN); Maiyuran Wijayanathan, Waterloo (CA); Stephen McCann, Southampton (GB); Mark Earnshaw, Kanata (CA); Chen-Ho Chin, Deerlijk (BE)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,456

(22) Filed: Oct. 26, 2020

(65) Prior Publication Data

US 2021/0045019 A1    Feb. 11, 2021

Related U.S. Application Data

(63) Continuation of application No. 16/035,934, filed on Jul. 16, 2018, now Pat. No. 11,039,344, which is a
(Continued)

(51) Int. Cl.
*H04W 36/14*    (2009.01)
*H04W 76/30*    (2018.01)
(Continued)

(52) U.S. Cl.
CPC ... *H04W 36/0022* (2013.01); *H04W 36/0016* (2013.01); *H04W 36/0061* (2013.01);
(Continued)

(58) Field of Classification Search
CPC ......... H04W 36/0022; H04W 36/0016; H04W 36/0061; H04W 36/14; H04W 60/00;
(Continued)

(56) References Cited

U.S. PATENT DOCUMENTS

| | | |
|---|---|---|
| 6,295,450 B1 | 9/2001 | Lyer et al. |
| 6,792,284 B1 | 9/2004 | Dalsgaard et al. |

(Continued)

FOREIGN PATENT DOCUMENTS

| | | |
|---|---|---|
| CN | 1627836 | 6/2005 |
| CN | 1984429 | 6/2007 |

(Continued)

OTHER PUBLICATIONS

3GPP TS 23.272 V1.0.0 (Mar. 2008): 3rd Generation Partnership Project; Technical Specification Group Services and System Aspects; Circuit Switched Fallback in Evolved Packet System; Stage 2 (Release 8).
(Continued)

*Primary Examiner* — Mohamed A Kamara
(74) *Attorney, Agent, or Firm* — Fish & Richardson P.C.

(57) ABSTRACT

A method performed by user equipment (UE) includes receiving a request to access a service unavailable through a first network cell associated with the UE, and receiving a message from an access device associated with the first network cell, wherein the message identifies a plurality of second network cells providing the service.

17 Claims, 14 Drawing Sheets

Related U.S. Application Data continuation of application No. 15/285,358, filed on Oct. 4, 2016, now Pat. No. 10,028,178, which is a continuation of application No. 14/882,290, filed on Oct. 13, 2015, now Pat. No. 9,554,315, which is a continuation of application No. 13/244,760, filed on Sep. 26, 2011, now abandoned, which is a continuation of application No. 12/817,157, filed on Jun. 16, 2010, now Pat. No. 8,873,407.

(60) Provisional application No. 61/187,640, filed on Jun. 16, 2009.

(51) Int. Cl.
*H04W 36/00* (2009.01)
*H04W 60/00* (2009.01)
H04W 88/06 (2009.01)
H04W 60/04 (2009.01)

(52) U.S. Cl.
CPC ........... *H04W 36/14* (2013.01); *H04W 60/00* (2013.01); *H04W 36/0083* (2013.01); *H04W 36/0085* (2018.08); *H04W 60/04* (2013.01); *H04W 76/30* (2018.02); *H04W 88/06* (2013.01)

(58) Field of Classification Search
CPC ......... H04W 36/0083; H04W 36/0085; H04W 60/04; H04W 76/30; H04W 88/06; H04W 48/12; H04W 48/18; H04W 48/08; H04W 68/02
See application file for complete search history.

(56) References Cited

U.S. PATENT DOCUMENTS

| | | | |
|---|---|---|---|
| 7,702,343 | B2 | 4/2010 | Manohar |
| 7,769,382 | B2 | 8/2010 | Rasanen et al. |
| 7,873,359 | B2 | 1/2011 | Lee et al. |
| 8,306,537 | B2 | 11/2012 | Burbidge et al. |
| 8,320,291 | B2 | 11/2012 | Rune et al. |
| 8,842,633 | B2 | 9/2014 | Dwyer et al. |
| 8,861,433 | B2 | 10/2014 | Burbidge et al. |
| 8,873,407 | B2 | 10/2014 | Burbidge et al. |
| 8,958,389 | B2 | 2/2015 | Vikberg et al. |
| 9,094,880 | B2 | 7/2015 | Prakash |
| 9,319,942 | B2 | 4/2016 | Koskinen et al. |
| 9,426,697 | B2 | 8/2016 | Burbidge et al. |
| 9,554,315 | B2 * | 1/2017 | Burbidge ............... H04W 48/18 |
| 9,674,734 | B2 | 6/2017 | Burbidge et al. |
| 10,028,178 | B2 * | 7/2018 | Burbidge ............... H04W 60/00 |
| 11,039,344 | B2 * | 6/2021 | Burbidge ............... H04W 48/12 |
| 2003/0119481 | A1 | 6/2003 | Haverinen et al. |
| 2005/0073977 | A1 | 4/2005 | Vanghi et al. |
| 2005/0237961 | A1 | 10/2005 | Yi et al. |
| 2005/0250529 | A1 | 11/2005 | Funnell et al. |
| 2005/0271067 | A1 | 12/2005 | King et al. |
| 2006/0166699 | A1 | 7/2006 | Aghvami et al. |
| 2007/0097914 | A1 | 5/2007 | Grilli et al. |
| 2007/0209051 | A1 | 9/2007 | Xu et al. |
| 2008/0189970 | A1 | 8/2008 | Wang et al. |
| 2008/0192697 | A1 | 8/2008 | Shaheen |
| 2008/0293419 | A1 | 11/2008 | Somasumdaram et al. |
| 2009/0036131 | A1 | 2/2009 | Diachina et al. |
| 2009/0047958 | A1 | 2/2009 | Rimhagen |
| 2009/0238143 | A1 | 9/2009 | Mukherjee et al. |
| 2009/0258631 | A1 | 10/2009 | Forsberg et al. |
| 2009/0274086 | A1 | 11/2009 | Petrovic et al. |
| 2009/0275319 | A1 | 11/2009 | Aoyama et al. |
| 2009/0316655 | A1 | 12/2009 | Prakash |
| 2010/0022250 | A1 | 1/2010 | Petrovic |
| 2010/0098023 | A1 | 4/2010 | Aghill et al. |
| 2010/0165948 | A1 | 7/2010 | Ore et al. |
| 2010/0182971 | A1 | 7/2010 | Chin |
| 2010/0202413 | A1 | 8/2010 | Vikberg et al. |
| 2010/0227627 | A1 | 9/2010 | Ishil et al. |
| 2010/0234026 | A1 | 9/2010 | Tenny et al. |
| 2010/0296421 | A1 | 11/2010 | Walta et al. |
| 2010/0303041 | A1 | 12/2010 | Diachina et al. |
| 2010/0316000 | A1 | 12/2010 | Burbidge et al. |
| 2010/0316034 | A1 | 12/2010 | Burbidge et al. |
| 2010/0317347 | A1 | 12/2010 | Burbidge et al. |
| 2010/0317348 | A1 | 12/2010 | Burbidge et al. |
| 2010/0331011 | A1 | 12/2010 | Vikberg et al. |
| 2011/0014912 | A1 | 1/2011 | Ahluwalia et al. |
| 2011/0053593 | A1 | 3/2011 | Tanabe et al. |
| 2011/0080867 | A1 | 4/2011 | Mildh |
| 2011/0080894 | A1 | 4/2011 | Iwamura et al. |
| 2011/0117931 | A1 | 5/2011 | Hu et al. |
| 2011/0142239 | A1 | 6/2011 | Suh et al. |
| 2011/0230193 | A1 | 9/2011 | Vikberg et al. |
| 2012/0015646 | A1 | 1/2012 | Burbidge et al. |
| 2012/0127957 | A1 | 5/2012 | Koskinen et al. |
| 2012/0157100 | A1 | 6/2012 | Suzuki et al. |
| 2012/0202500 | A1 | 8/2012 | Wu |
| 2012/0302196 | A1 | 11/2012 | Chin et al. |
| 2012/0309399 | A1 | 12/2012 | Wu et al. |
| 2015/0201356 | A1 | 7/2015 | Wang et al. |
| 2015/0373733 | A1 * | 12/2015 | Bangolae .......... H04W 72/0406 370/329 |
| 2018/0279184 | A1 | 9/2018 | Burbidge et al. |
| 2018/0324650 | A1 | 11/2018 | Burbidge et al. |
| 2019/0261227 | A1 | 8/2019 | Guo |

FOREIGN PATENT DOCUMENTS

| | | |
|---|---|---|
| CN | 1984437 | 6/2007 |
| CN | 1984485 | 6/2007 |
| EP | 1423983 | 6/2004 |
| WO | 2008000914 | 1/2008 |
| WO | 2008058877 | 5/2008 |
| WO | 2008099341 | 8/2008 |
| WO | 2008148432 | 12/2008 |
| WO | 2008155314 | 12/2008 |
| WO | 2009000315 | 12/2008 |
| WO | 2009054702 | 4/2009 |
| WO | 2009057960 | 5/2009 |
| WO | 2009116691 | 9/2009 |
| WO | WO-2010106397 A1 * | 9/2010 ........ H04W 36/0022 |

OTHER PUBLICATIONS

3GPP TS 23.272 V1.1.0 (Apr. 2008): 3rd Generation Partnership Project; Technical Specification Group Services and System Aspects; Circuit Switched Fallback in Evolved Packet System; Stage 2 (Release 8).

3GPP TS 23.272 V1.2.0 (May 2008): 3rd Generation Partnership Project; Technical Specification Group Services and System Aspects; Circuit Switched Fallback in Evolved Packet System; Stage 2 (Release 8).

3GPP TS 23.272 V2.0.0 (Jun. 2008): 3rd Generation Partnership Project; Technical Specification Group Services and System Aspects; Circuit Switched Fallback in Evolved Packet System; Stage 2 (Release 8).

3GPP TS 23.272 V8.1.0 (Sep. 2008): Circuit Switched Fallback in Evolved Packet System, Stage 2 (Release 8).

3GPP TS 23.272 V8.2.0 (Dec. 2008) Circuit Switched Fallback in Evolved Packet System, 3rd Generation Partnership Project, Technical Specification Group Services and System Aspects, Stage 2, (Release 8), Dec. 2008, 46 pages.

3GPP TS 24.301 V8.1.0 (Mar. 2009) Technical Specification 3rd Generation Partnership Project; Technical Specification Group Core Network and Terminals; Non-Access-Stratum (NAS) protocol for Evolved Packet System (EPS); Stage 3 (Release 8), 239 pages.

3GPP TS 44.060 V8.4.0 (Feb. 2009) Technical Specification 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8), 589 pages.

(56) References Cited

OTHER PUBLICATIONS

3GPP TSG-RAN WG3, No. 60: "CS capability of network for CS fallback," R3-0081160 (May 5, 2008), XP002582621, 6 pages.
3GPP: "3rd Generation Partnership Project: Technical Specification Group Services and Systems Aspect; Radio Resource Control (RRC); Protocol specification (Release 8)." 3GPP TS 25.331 version 8.5.0 (Feb. 2009), 6 pages.
3GPP: "3rd Generation Partnership Project; Technical Specification Group GSM/EDGE Radio Access Network; Mobile radio interface layer 3 specification; Radio Resource Control (RRC) protocol (Release 9)," 3GPP TS 44.018 v9.1.0 (May 2009), No. version 9.1.0, May 1, 2009 (May 1, 2009), XP007915562, 422 pages.
3GPP: "3rd Generation Partnership Project; Technical Specification Group Radio Access Network; Evolved Universal Terrestrial Radio Access (E-UTRA) Radio Resource Control (RRC); Protocol Specification (Release 8)," 3GPP TS 36.331 V8.5.0 (Mar. 2009), XP007915618, 204 pages.
3GPP: "3rd Generation Partnership Project; Technical Specification Group Services and System Aspects; Circuit Switched Fallback in Evolved Packet System; Stage 2 (Release 8)," 3GPP TS 23.272 V8.3.0 (Mar. 2009), 47 pages.
3GPP: "3rd Generation Partnership Project; Technical Specification Group Services and System Aspects; Circuit Switched Fallback in Evolved Packet System; Stage 2 (Release 9)," 3GPP TS 23.272 V9.0.0 (Jun. 2009), XP007915561, 50 pages.
3GPP: "3rd Generation Partnership Project; Technical Specification Group Services and System Aspects; General Packet Radio Service Enhancements for Evolved Universal Terrestrial Radio Access Network Access (Release 8)," 3GPP TS 23.401 V8.5.0 (Mar. 2009), 226 pages.
3GPP: "3rd Generation Partnership Project; Technical Specification Group Services and System Aspects; Radio Resource Control Protocol Specification (Release 9)," 3GPP TS 36.331 V8.5.0 (Apr. 2009), 205 pages.
3GPP: "Digital cellular telecommunications system (Phase 2+); Mobile radio interface layer 3 specification; Radio Resource Control (RRC) protocol" (3GPP TS 44.018 version 8.6.0 Release 8). ETSI TS 144 018 V8.6.0 (Apr. 2009).
3GPP: "LTE; General Packet Radio Service (GPRS) enhancements for Evolved Universal Terrestrial Radio Access Network (EUTRAN) access" (3GPP TS 23.401 version 8.5.0 Release 8). ETSI TS 123 401 V8.5.0 (Mar. 2009).
3GPP: "Universal Mobile Telecommunications System (UMTS); Radio Resource Control (RRC); Protocol specification (3GPP TS 25.331 version 8.6.0 Release 8)," ETSI TS 125 331 V8.6.0 Technical Specification, Apr. 2009, 1688 pages.
3rd Generation Partnership Project, Technical Specification Group Radio Access Network, Evolved Universal Terrestrial Radio Access Network (EUTRAN), S1 Application Protocol (S1 AP) (Release 8), 3GPP TS 36.413 V8.6.1, Jun. 1, 2019, 218 pages.
3rd Generation Partnership Project; Technical Specification Group Services and System Aspects; Study on Circuit Switched (CS) domain services over evolved Packet Switched (PS) access; Stage 2 (Release 9), 3GPP TR 23.879, Mobile Competence Centre; 650, Route Des Lucioles; F-06921 Sophia-Aniipolis Cedex; France, V1.2.0, (Jan. 1, 2009), XP050364077, 62 pages.
*Blackberry Limited v Nokia Solutions and Networks GmbH & Co. KG*, "Post-trial Brief [English]," issued in Reference No. BA138/17-1, Document No. D24/68-18 on Jun. 25, 2018, 27 pages.
*Blackberry Limited v Nokia Solutions and Networks Oy*, "Post-Trial Brief," issued in Reference No. B142873 TMS/LST/KAU/WDM/thu, Docket No. 7O28/17, issued on Jun. 25, 2018, 26 pages.
*Blackberry Limited v Nokia Solutions and Networks Oy*, Exhibit AR11, Reference No. N3203283DEIEPMm Ah/vm, docket No. 6Ni17/17, patent No. 2443873 issued on Jun. 25, 2018, 9 pages.
*Blackberry Limited v Nokia Solutions and Networks Oy*, IPR Documentation received from Bardehle Pagenberg, Regional Court of Mannheim—7th Civil Chamber, reference No. B142873 TMS/:st/WDM/thu, docket No. 7028/17 on Jul. 18, 2017, 27 pages.
*Blackberry Limited v Nokia Solutions and Networks Oy*, IPR Documentation Received from Bardehle Pagenberg, Regional Court of Mannheim—7th Civil Chamber, reference No. B142873 TMS/LST/KAU/WDM/thu, docket No. 7O28/17 on Jun. 25, 2018, 26 pages.
*Blackberry Limited v Nokia Solutions Networks GmbH & Co. KG*, "Surrejoinder," European Patent 2443873B1, dated Feb. 14, 2018, 60 pages.
Choi, Jae Woo; Kang, Jeon ii; and Nyang, Dae Hun, "Efficient Traffic Management Scheme for Fast Authenticated Handover in IEEE 802.16e Network", 2005, vol. 30, No. 6C, 8 pages (With English abstract).
Ericsson: "Radio Resource Management Aspects of Inter-RAT Handovers," Internet Citation, (Mar. 30, 2007), XP002469420, Retrieved from the Internet: URL: http//www.quintillion.co.jp/3GPP/TSG_RAN/TSG_RAN2007/TSG_RAN_WG2_RL2_3.html (retrieved on Feb. 18, 2008), 4 pages.
ETSI TS 123-272, V9.3.0, Digital cellular telecommunications system (Phase 2+); Universal Mobile Telecommunications System (UMTS); LTE; Circuit Switched (CS), Fallback in Evolved Packet System (EPS); Stage 2, (3GPP TS 23.272 version 9.3.0 Release 9), Mar. 2010, 14 pages.
ETSI TS 125-331, V5.5.0, Universal Mobile Telecommunications Systems (UMTS): Radio Resource Control (RRC) protocol specification (3GPP TS 25.331 version 5.5.0 Release 5), Jun. 2003, 37 pages.
Johnson, "Radio Access Networks for UMTS: Principles and Practice," 2008, 514-531, 18 pages.
LTE; Evolved Universal Terrestrial Radio Access (E-UTRA); Radio Resource Control (RRC); Protocol specification (3GPP TS 36.331 version 8.6.0 Release 8), Technical Specification, European Telecommunications Standards Institute (ETSI), 650 Route Des Lucioles; F-06921 Sophia-Antipolis; France, (Jul. 1, 2009), XP014044 759, 211 pages.
Motorola: "Correction of flows for call termination in idle mode," 3GPP Draft; S2-084825 CSFB Term Flow Correction-Idle, 3rd Generation Partnership Project (3GPP), Mobile Competence Centre; 650, Route Des Lucioles; F-06921 Sophia-Antipolis Cedex; France, SAWG2, Montreal; Retrieved on Jun. 18, 2008, XP050266919, 4 pages.
NEC, "Fast CS Service Redirection for LTE Discussion and Decision," 3GPP TSG-RAN WG2 RRC Adhoc, R2-083007, R2-082423, Jun. 5-6, 2009, 7 pages.
NEC, "Fast CS Service Redirection for LTE," 3rd Generation Partnership Project, 3GPP TSG-RAN WG3 #60, R3-081407, May 5-9, 2008, Kansas City, USA, 4 pages.
Nokia Corporation et al., "CS Fallback Options," 3rd Generation Partnership Project, 3GPP TSG-RAN WG2 Meeting RRC Adhoc, R2-082940, Jun. 5-6, 2008, 2 pages.
Nokia Corporation et al: "Handling Neighbour Cell Lists for E-UTRAN," 3GPP Draft; GP-080167, 3rd Generation Partnership Project (3GPP), Mobile Competence Centre; 650, Route Des Lucioles; F-06921 Sophia-Antipolis Cedex, France, RAN WG4, Shenzhen, China; (Mar. 27, 2008), XP050179188, 8 pages.
*Nokia of America Corporation v Blackberry Limited*, Patent Owner's Preliminary Response to Petition for Inter Partes Review of U.S. Pat. No. 9,426,697, Case No. IPR2018-00563, U.S. Pat. No. 9,426,697, dated Feb. 1, 2018, 47 pages.
*Nokia of America Corporation v Blackbery Limited*, "Patent Owner's Preliminary Response to Petition for Inter Partes Review of U.S. Pat. No. 8,861,433," Case No. IPR2018-00562, U.S. Pat. No. 8,861,433, dated Feb. 1, 2018, 46 pages.
*Nokia of America Corporation v. Blackberry Limited*, "Decision: Denying Inter Partes Review," Case IPR2018-00562, Patent No. 861433, paper 11, Aug. 13, 2018, 15 pages.
*Nokia of America Corporation v. Blackberry Limited*, "Decision: Denying Inter Partes Review," Case IPR2018-00563, U.S. Pat. No. 9,426,697, paper 11, Aug. 13, 2018, 15 pages.
*Nokia of America Corporation v. Blackberry Ltd.*, "Nokia of America Corporation's Petition for Inter Partes Review," Case No. [Unassigned], U.S. Pat. No. 8,861,433, dated Feb. 1, 2018, 61 pages.

(56) References Cited

OTHER PUBLICATIONS

*Nokia of America Corporation* v. *Blackberry Ltd.*, "Nokia of America Corporation's Petition for Inter Partes Review," Case No. [Unassigned], U.S. Pat. No. 9,426,697, dated Feb. 1, 2018, 62 pages.
Nokia Siemens Networks et al: "Clarification of ISR Usage for CSFB," 3GPP Draft; S2-087331 WAS 7309-VO, 3rd Generation Partnership Project (3GPP), Mobile Competence Centre; 650, Route Des Lucioles; F-06921 Sophia-Antipolis Cedex; France; China; (Retrieved on Oct. 17, 2008), XP050331790, 8 pages.
*Nokia Solutions and Networks Oy* v *Blackberry Limited*, "Rejoiner [translation]," issued in reference No. B142873NI/JLA/TMS/KAU/Str, docket No. 6Ni 17/17 EP, issued on Jun. 25, 2018, 40 pages.
NTT Docomo et al: "TP to TS 36.331 to remove T312," 3GPP Draft; R2-085938, Mobile Competence Centre; 650, Route Des Lucioles; F06921 Sophia-Antipolis Cedex; France, Prague, Czech Republic; (Retrieved Oct. 3, 2008), XP050320650), 8 pages.
Toskala et al., "LTE Radio Protocols (Chapter 6)" In: LTE for UMTS: OFOMA and SC-FOMA Based Radio Access, Wiley, XP055054236, Jun. 12, 2009, 31 pages.
CN Office Action issued in Chinese Application No. 201510075373.X dated Aug. 22, 2017, 7 pages.
CN Office Action issued in Chinese Application No. 201510075373.X dated Mar. 21, 2018, 6 pages.
CN Office Action issued in Chinese Application No. 201510075373.X dated Sep. 17, 2018, 4 pages.
CN Office Action issued in Chinese Application No. 201510075373.X dated Feb. 27, 2019, 7 pages.
CN Office Action issued in Chinese Application No. 201510075373.X dated Jun. 6, 2019, 7 pages.
CN Office Action issued in Chinese Application No. 201510075373.X dated Nov. 25, 2019, 5 pages.
CN Notice of Allowance issued in Chinese Application No. 201510075373.X dated Mar. 20, 2020, 4 pages (With English Translation).
EP Extended European Search Report issued in European Application No. 16166377.8 dated May 20, 2016, 10 pages.
EP Communication Pursuant to Article 94(3) EPC issued in European Application No. 10742877.3 dated Oct. 24, 2016, 6 pages.
EP Communication Pursuant to Article 94(3) EPC issued in European Application No. 10744994.4 dated Dec. 8, 2016, 6 pages.
EP Communication Pursuant to Article 94(3) EPC issued in European Application No. 16166377.8 dated Jun. 26, 2017, 4 pages.
EP Communication Pursuant to Article 94(3) EPC issued in European Application No. 10742877.3 dated Jul. 12, 2017, 6 pages.
EP Extended European Search Report issued in European Application No. 17186402.8 dated Sep. 27, 2017, 10 pages.
EP Extended European Search Report issued in European Application No. 18187505.5 dated Sep. 20, 2018, 10 pages.
EP Decision to Grant a European Patent Pursuant to Article 97(1) EPC issued in European Application No. 16166377.8 dated Sep. 13, 2018, 2 pages.
EP Communication pursuant to Rule 69 EPC—reminder concerning payment of the designation fee (Art. 79(2) EPC) and of the examination fee (Art. 94(1) EPC)—and invitation pursuant to Rule 70a(1) EPC issued in European Application No. 18187505,5 on Jan. 4, 2019, 2 pages.
EP Decision to Grant a European Patent Pursuant to Article 97(1) EPC in European Application No. 18187505.5 on Oct. 22, 2019, 5 pages.
EP Communication Pursuant to Article 94(3) EPC issued in European Application No. 10744994.4 dated Nov. 5, 2019, 5 pages.
EP Extended European Search Report issued in European Application No. 20162832.8 dated Apr. 21, 2020, 9 pages.
EP Communication Pursuant to Article 94(3) EPC issued in European Application No. 10744994.4 dated Jun. 5, 2020, 4 pages.
PCT International Preliminary Report on Patentability and Written Opinion in International Application No. PCT/IB2010/001643, dated Dec. 29, 2011, 14 pages.
PCT International Preliminary Report on Patentability and Written Opinion in International Application No. PCT/IB2010/001644, dated Dec. 29, 2011, 14 pages.
PCT International Preliminary Report on Patentability and Written Opinion in International Application No. PCT/IB2010/001703, dated Dec. 29, 2011, 10 pages.
PCT International Preliminary Report on Patentability and Written Opinion in International Application No. PCT/IB2010/001707, dated Dec. 29, 2011, 10 pages.
PCT International Search Report and PCT Written Opinion in International Application No. PCT/IB2010/001707, dated Dec. 20, 2010, 14 pages.
PCT International Search Report and PCT Written Opinion in International Application No. PCT/IB2010/001644, dated Nov. 16, 2010, 19 pages.
PCT International Search Report and PCT Written Opinion in International Application No. PCT/IB2010/001702, dated Nov. 18, 2010, 18 pages.
PCT International Search Report and PCT Written Opinion in International Application No. PCT/IB2010/001643, dated Nov. 19, 2010, 21 pages.
PCT International Search Report and PCT Written Opinion in International Application No. PCT/IB2010/001633, dated Oct. 14, 2010, 16 pages.
PCT International Search Report and PCT Written Opinion in International Application No. PCT/IB2010/001703, dated Oct. 14, 2010, 16 pages.
Advisory Action issued in U.S. Appl. No. 12/817,159 dated Jul. 26, 2017, 3 pages.
Non-Final Office Action issued in U.S. Appl. No. 12/817,159 dated Oct. 3, 2017, 29 pages.
Non-Final Office Action issued in U.S. Appl. No. 15/685,898 dated Dec. 1, 2017, 33 pages.
Non-Final Office Action issued in U.S. Appl. No. 15/285,358 dated Dec. 6, 2017, 18 pages.
Non-Final Office Action issued in U.S. Appl. No. 12/817,159 dated Mar. 16, 2018, 14 pages.
Notice of Allowance issued in U.S. Appl. No. 12/817,159 dated Jun. 26, 2018, 8 pages.
Notice of Allowance issued in U.S. Appl. No. 15/685,898 dated Aug. 28, 2018, 8 pages.
Notice of Allowance issued in U.S. Appl. No. 12/817,159 dated Sep. 12, 2018, 8 pages.
Notice of Allowance issued in U.S. Appl. No. 15/685,898 dated Sep. 19, 2018, 2 pages.
Non-Final Office Action issued in U.S. Appl. No. 15/995,473 dated Sep. 19, 2018, 10 pages.
Non-Final Office Action issued in U.S. Appl. No. 15/595,333 dated Nov. 19, 2018, 28 pages.
Notice of Allowance issued in U.S. Appl. No. 12/817,159 dated Dec. 21, 2018, 8 pages.
Notice of Allowance issued in U.S. Appl. No. 12/817,159 dated Feb. 1, 2019, 10 pages.
Notice of Allowance issued in U.S. Appl. No. 15/595,333 dated Mar. 21, 2019, 37 pages.
Notice of Corrected allowability in U.S. Appl. No. 12/817,159 dated Mar. 26, 2019, 7 pages.
Final Office Action issued in U.S. Appl. No. 15/995,473 dated Apr. 1, 2019, 36 pages.
Notice of Allowance issued in U.S. Appl. No. 12/817,159 dated Apr. 3, 2019, 12 pages.
Advisory Action issued in U.S. Appl. No. 15/995,473 dated May 22, 2019, 2 pages.
Non-Final Office Action issued in U.S. Appl. No. 15/595,473 dated Jun. 20, 2019, 9 pages.
Non-Final Office Action issued in U.S. Appl. No. 16/035,934 dated Jul. 10, 2019, 75 pages.
Final Office Action issued in U.S. Appl. No. 15/995,473 dated Dec. 30, 2019, 33 pages.
Notice of Allowance issued in U.S. Appl. No. 16/035,934 dated Jan. 22, 2020, 14 pages.
Advisory Action issued in U.S. Appl. No. 15/995,473 dated Mar. 18, 2020, 3 pages.

(56) References Cited

OTHER PUBLICATIONS

Non-Final Office Action issued in U.S. Appl. No. 15/995,473 dated Apr. 1, 2020, 13 pages.
Corrected Notice of Allowability issued in U.S. Appl. No. 16/035,934 dated Apr. 3, 2020, 6 pages.
Non-Final Office Action issued in U.S. Appl. No. 16/035,934 dated May 7, 2020, 19 pages.
Notice of Allowance issued in U.S. Appl. No. 15/995,473 dated Aug. 3, 2020, 12 pages.
Final Office Action issued in U.S. Appl. No. 15/995,473 dated Oct. 23, 2020, 18 pages.
Notice of Allowance issued in U.S. Appl. No. 16/035,934 dated Dec. 4, 2020, 13 pages.
Notice of Allowance issued in U.S. Appl. No. 15/995,473 dated Dec. 18, 2020, 7 pages.
Non-Final Office Action issued in U.S. Appl. No. 16/450,311 dated Aug. 19, 2021, 19 pages.
Non-Final Office Action issued in U.S. Appl. No. 16/450,311 dated Feb. 19, 2021, 83 pages.
Notice of Allowance issued in U.S. Appl. No. 16/035,934 dated Mar. 16, 2021, 13 pages.
Notice of Allowance issued in U.S. Appl. No. 15/995,473 dated Apr. 19, 2021, 15 pages.
EP Extended European Search Report issued in European Application No. 21196679.1 dated Dec. 16, 2021, 8 pages.
Final Office Action issued in U.S. Appl. No. 16/450,311 dated Mar. 3, 2022, 23 pages.
Advisory Action issued in U.S. Appl. No. 16/450,311 dated Jun. 7, 2022, 3 pages.
Notice of Allowance issued in U.S. Appl. No. 16/450,311 dated Sep. 1, 2022, 9 pages.

\* cited by examiner

300 → UE <- BSS/MSC ------ Paging request (PCH)
302 → UE -> BSS/MSC ------ Channel request (RACH)
332 → UE <- BSS/MSC ------ Immediate Assignment (AGCH) ----- Assignment for TCH/F
334 → UE -> BSS/MSC ------ Paging Response (FACCH)
336 → UE <- BSS/MSC ------ Setup (FACCH)
338 → UE -> BSS/MSC ------ Call Confirmation (FACCH)
340 → UE -> BSS/MSC ------ Alert (FACCH)
342 → UE -> BSS/MSC ------ Connect (FACCH)
344 → UE <- BSS/MSC ------ Connect Acknowledge (FACCH)
346 → UE <-> BSS/MSC ------ Speech (TCH)
348 → UE <- BSS/MSC ------ Channel Modify (FACCH)

Fig. 10

METHOD FOR ACCESSING A SERVICE UNAVAILABLE THROUGH A NETWORK CELL

BENEFIT OF PRIORITY

This application is a continuation of U.S. patent application Ser. No. 12/817,157 filed on Jun. 16, 2010, which is based on and claims the benefit of U.S. Provisional Application No. 61/187,640, entitled "System and Method for Implementing Circuit-Switched Fallback," the entire contents of each of which is incorporated herein by reference in its entirety.

BACKGROUND

The present disclosure relates generally to implementing fallback to enable user equipment to obtain service from a network cell not currently associated with the user equipment, for example, circuit-switched fallback, and, more specifically, to minimizing delay and improving reliability for circuit-switched fallback.

As used herein, the term "device" can refer to a mobile station (MS), a user agent (UA), or user equipment (UE), and can include electronic devices such as fixed and mobile telephones, personal digital assistants, handheld or laptop computers, smartphones, televisions and similar devices that have network communications capabilities. The terms may also refer to devices that have similar capabilities but that are not readily transportable, such as desktop computers, set-top boxes, IPTVs or network nodes. The term "UE" can also refer to any hardware or software component that can terminate a communication session that could include, but is not limited to, a Session Initiation Protocol (SIP) session. Also, the terms "user agent," "UA," "user equipment, "UE," and "node" might be used synonymously herein. Those skilled in the art will appreciate that these terms can be used interchangeably.

A UE may operate in a wireless communications network that provides high-speed data and/or voice communications. The wireless communications networks may implement circuit-switched (CS) and/or packet-switched (PS) communication protocols to provide various services. For example, the UE may operate in communications networks using different radio access technologies (RAT), such as an Enhanced Universal Terrestrial Radio Access Network (E-UTRAN), Universal Terrestrial Radio Access Network (UTRAN), Global System for Mobile Communications (GSM) network, Evolution-Data Optimized (EV-DO), 3GSM, Digital Enhanced Cordless Telecommunications (DECT), Digital AMPS (IS-136/TDMA), and Integrated Digital Enhanced Network (iDEN), Universal Mobile Telecommunications System (UMTS), Enhanced Data rates for GSM Evolution (EDGE), GPRS/EDGE Radio Access Network (GERAN), and/or General Packet Radio Service (GPRS) technology. Other wireless networks that UE may operate in include but are not limited to Code Division Multiple Access (CDMA), cdma2000, cdma2000 1×RTT, cdma2000 HRPD, WLAN (e.g. IEEE 802.11) and WRAN (e.g. IEEE 802.22). UE may also operate in fixed network environments such as example Digital Subscriber Line (xDSL) environments, Data Over Cable Service Interface Specification (DOCSIS) cable networks, Wireless Personal Area Networks (PAN), Bluetooth, ZigBee, Wireless Metropolitan Area Networks (MAN) (e.g., WiMAX, IEEE 802.20, IEEE 802.22 ethernet) or optical networks. Some UE may be capable of multimode operation where they can operate on more than one access network technology either on a single access network at a time or in some devices using multiple access technologies simultaneously.

In wireless telecommunications systems, transmission equipment in a base station transmits signals throughout a geographical region known as a cell. As technology has evolved, more advanced equipment has been introduced that can provide services that were not possible previously. Such advanced equipment may include, for example, an evolved universal terrestrial radio access network (E-UTRAN) node B (eNB). Such advanced or next generation equipment may be referred to as long-term evolution (LTE) equipment, and a packet-based network that uses such equipment can be referred to as an evolved packet system (EPS). As used herein, the term "access device" will refer to any component, such as a traditional base station, eNB, or other LTE access devices, that can provide UE with access to other components in a telecommunications system.

The different networks described above provide a variety of services to connected UE. Some networks, for example, provide only PS services and cannot provide CS voice or other CS domain services. As such, UE may be configured to connect to different types of networks to access both PS and CS domain services. For example, if UE is connected to a first network cell that does not provide CS domain service, the UE may be configured to implement CS fallback to connect to an accessible network such as a GERAN or UTRAN to access voice or other CS domain services provided by those networks. As such, a CS fallback procedure allows UE connected to a network using a first RAT and providing only PS domain services to connect to another network using a second RAT and providing CS domain services. CS fallback may be used, for example, to initiate voice calls via a cell of a network providing CS domain services, when, at the time of initiating the voice call, the UE was associated with a cell of a network that only provides PS domain services. The UE initiating the voice call may be either idle or active on the cell of the network that only provides PS domain services. In case the UE is idle it can be said to be camped on the cell and may be monitoring the paging channel of that cell for paging messages for mobile-terminated sessions or calls. In case the UE is active it may be communicating with the cell and transferring data for a PS domain service.

FIG. 1 is an illustration of a CS fallback process wherein UE 10 transitions from an E-UTRAN cell to a GERAN or UTRAN cell to access CS domain services for initiating a voice call. In FIG. 1, UE 10 is initially connected to E-UTRAN cell 100. Because E-UTRAN cell 100 does not provide CS domain services, UE 10 implements CS fallback to communicate with the GERAN or UTRAN cell 102 to access CS domain services. Depending upon network implementation, it is not necessary that cells 100 and 102 be co-extensive. However, to transfer from one cell to another, UE 10 should be within the communication range of each cell.

In FIG. 1, UE 10 is first connected to or camped on E-UTRAN cell 100. To initiate a mobile-originated voice call, UE 10 transmits a signal 104 to E-UTRAN cell 100 that includes a request to initiate a voice call. After receiving the request, E-UTRAN cell 100 transmits a signal 106 to UE 10 indicating that the voice call cannot be supported because E-UTRAN cell 100 cannot provide the necessary CS domain services. Signal 106 may also include a reference identifying a candidate GERAN or UTRAN cell 102, which does support the CS domain services for the voice call. After receiving signal 106, UE 10 transfers to GERAN or UTRAN cell 102 using the information provided in signal 106. The transfer may be implemented using a handover procedure, cell change order (CCO) procedure, PS handover procedure, or redirection procedure, for example. Note that in FIG. 1, arrow 108 only indicates the transfer of UE 10's communication from one cell to another, and does not indicate physical movement of UE 10. After transferring to GERAN or UTRAN cell 102, UE 10 establishes a connection for initiating the voice call as indicated by line 110. In the case of a mobile-terminated voice call, UE 10 may be first paged by E-UTRAN cell 100 for an incoming CS domain voice call. In response to the page, UE 10 follows a similar process as described above for the mobile-originated call to transfer to the GERAN or UTRAN cell 102 and after transferring UE 10 responds to the page on the GERAN or UTRAN cell 102.

To facilitate CS fallback, UE 10 may be configured to communicate with both PS-based and CS-based networks. For example, UE 10 may support combined procedures for EPS/International Mobile Subscriber Identity (IMSI) attach, and Tracking Area update for registering with a Mobility Management Entity (MME) to access PS domain services (for example, via an E-UTRAN, UTRAN or GERAN access network) and for registering with a Mobile Switching Center (MSC) to access CS domain services (for example, via a UTRAN or GERAN access network or another network supporting CS domain services). The combined procedures also allow the MSC and MME to create an association between one another so that each is aware that UE 10 is simultaneously registered with both the MSC and MME and that, therefore, the UE is registered with both the PS and CS networks.

When performing CS fallback, UE 10 may be in the best position to determine which cell or cells are candidate cells to fallback to—UE 10 can detect which cells are in close proximity or have particularly strong received signal strength or quality (or other such preferential parameters), and hence with which cells UE 10 would likely have a successful connection following the CS fallback process. As such, during the CS fallback process, UE 10 may undertake a measurement step to detect and identify the cells accessible to UE 10. In other words, before falling back to a cell providing CS domain services, UE 10 first searches for available candidate network cells via a measurement process.

The measurement step may involve interruptions in the downlink reception and uplink transmission activities of UE 10 during which UE 10's receiver is temporarily retuned to the frequencies that might be used by the candidate cells (e.g., in the case of GERAN candidate cells, the frequencies on which broadcast control channels (BCCH) may be transmitted) that may be accessible to UE 10. These interruptions are termed measurement gaps. The measurement gaps periodically occur. One standard currently defines 2 different periods: gap pattern 0, which gives a 6 ms measurement gap every 40 ms, and gap pattern 1, which gives a 6 ms measurement gap every 80 ms. Thus the measurement gap patterns give 7.5% (pattern 1) or 15% (pattern 0) of the UE 10's time to detect and perform measurements of cells of other networks, which therefore take a relatively long time.

FIG. 2 is an illustration of an exemplary measurement gap pattern that allows the receiver of UE 10 to be temporarily retuned to frequencies that might be used by GERAN cells to detect cells that are accessible to UE 10. At time t=0, RRC Connection Reconfiguration procedure is performed to begin the measurement process. Periodic measurement gaps 115 are then defined to allow UE 10 to perform measurements for GERAN cells. During measurement gaps 115, UE 10 reconfigures its receiver in an attempt to detect and/or measure available candidate cells. In the non-measurement gap periods 117, UE 10 assumes normal operation.

After the last measurement gap, sufficient measurements may have been performed by UE 10 and one or more candidate network cells that provide CS domain services may have been detected. UE 10 may then transmit measurement results to an access device of the PS network (e.g., an E-UTRAN eNB). The measurement results transmitted to the PS network may then be used by the PS network to determine an optimal CS network cell to which UE 10 may be transferred during the CS fallback procedure.

When implementing CS fallback, delay is a concern. If UE 10 is initially camped on an E-UTRAN cell and wishes to access CS domain services, a CS fallback process may be executed. While the RRC (radio resource control) connection setup procedure of the CS fallback process may be relatively short (150 ms is the target time for the E-UTRA system design) the measurement step and the step of selecting a target cell for CS domain services can potentially take a significant amount of time. As such, CS fallback may be delayed resulting in delays in establishing the CS domain services, possibly delaying the establishment of a voice connection for the user or negatively affecting other services accessed by UE 10. In particular, the need to carry out a number of steps while camped in E-UTRAN and possibly obtain system information for the target cell may result in a delay which, to the user, is noticeably longer than if UE 10 were initially camped on the target cell.

It is also possible that during CS fallback UE 10 may be directed to or select a target cell that has (or, in other words, is in, or belongs to) a different location area (LA) than the cell with which or in which UE 10 is currently registered. Any resulting location update may add further delay to establishing the CS domain service. Also, in a mobile-terminated call, it is possible that the LA of the target cell is associated with a different MSC from the MSC that handles the incoming call. In that case, call establishment may fail.

BRIEF DESCRIPTION OF THE DRAWINGS

For a more complete understanding of this disclosure, reference is now made to the following brief description, in connection with the accompanying drawings and detailed description, wherein like reference numerals represent like parts.

FIG. 10 illustrates a message flow for call setup on a CS network for a UE-terminated call using Fast Associated Control CHannel (FACCH) signaling;

DETAILED DESCRIPTION

Figure 1:
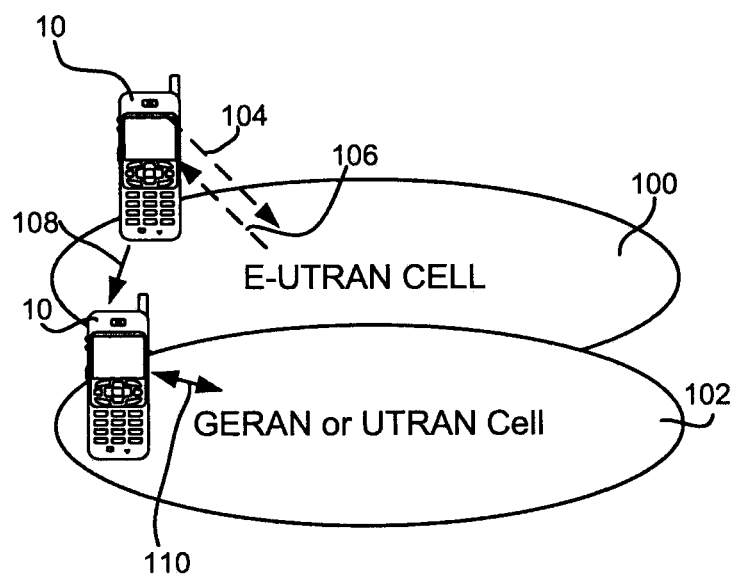
FIG. 1 is an illustration of a CS fallback process wherein UE transitions from an E-UTRAN cell to a GERAN or UTRAN cell to access CS domain services for initiating a voice call.

The present disclosure overcomes the aforementioned drawbacks and others by providing a system and method for implementing fallback to enable user equipment to obtain service from a network cell not currently associated with the user equipment, for example, circuit-switched (CS) fallback, and, specifically, for minimizing delay and improving reliability for CS fallback.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer or distributed between two or more computers.

The word "exemplary" is used herein to mean serving as an example, instance, or illustration. Any aspect or design described herein as "exemplary" is not to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer- or processor-based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In general, the inventive system and methods have been developed to reduce the delay and improve the reliability of a CS fallback process. CS fallback may be implemented for transitioning from E-UTRAN to GERAN, specifically, or, more generally, from a first network that does not provide CS domain services to a second network that does provide CS domain services. For example, CS fallback may be implemented to allow fallback from E-UTRANs to UTRAN or CDMA2000 networks. To this end, the present system provides a more efficient measurement algorithm to minimize delay during the fallback procedure. The system may also minimize communications that must be processed before CS fallback can be completed. Although the following disclosure is primarily focused on a system for implementing CS fallback from an E-UTRAN to a GERAN, the present disclosure applies to fallback between any combination of other networks such as E-UTRAN, WiMAX, UTRAN, CDMA2000 networks, or any networks.

When performing CS fallback, UE 10 may determine the most appropriate CS network cell to connect to. Alternatively, the network (for example an eNB) may select the CS network cell that the UE should connect to based on measurements of candidate cells provided by the UE. UE 10 can detect which CS network cells are in close proximity, and with which cells UE 10 has the highest quality connection. During CS fallback, UE 10 may undertake a measurement step to identify candidate cells accessible to UE 10, and search for available cells before transferring to a cell providing CS domain services. The UE may, as part of the search procedure, identify cells that can provide those services or, based on previously received or configured information, search only for cells known to provide those services.

When implementing CS fallback, delay is a concern. If UE 10 is initially camped on a GERAN or UTRAN cell, for example, CS voice call signaling may be started immediately. In contrast, if UE 10 is initially camped on an E-UTRAN cell, several additional steps (including steps 116-130 illustrated on FIG. 3) may be performed. While some of these additional steps may be relatively short (for example, 150 ms is the target time for the E-UTRA system design to establish an RRC connection), the inter-RAT measurement step (see step 124 of FIG. 3) and the step of selecting the target cell for CS domain services (see step 130 of FIG. 3) can potentially take a significant amount of time. As such, CS fallback may be delayed resulting in delays in establishing the CS domain services, possibly delaying the establishment of a voice connection or other service for the user.

Of additional concern, in conventional CS fallback processes, UE 10 may be directed to or select a GERAN or UTRAN cell that has a different location area (LA) from the cell with which UE 10 is currently associated. In that case, UE 10 may perform a location area update after arriving in the new cell before starting signaling related to the CS call. The location area update adds further delay to the CS domain service establishment. Furthermore, in a mobile-terminated call, it is possible that the new LA is associated with a different MSC from the MSC that handles the incoming call. In that case, call establishment may fail.

Figure 3:
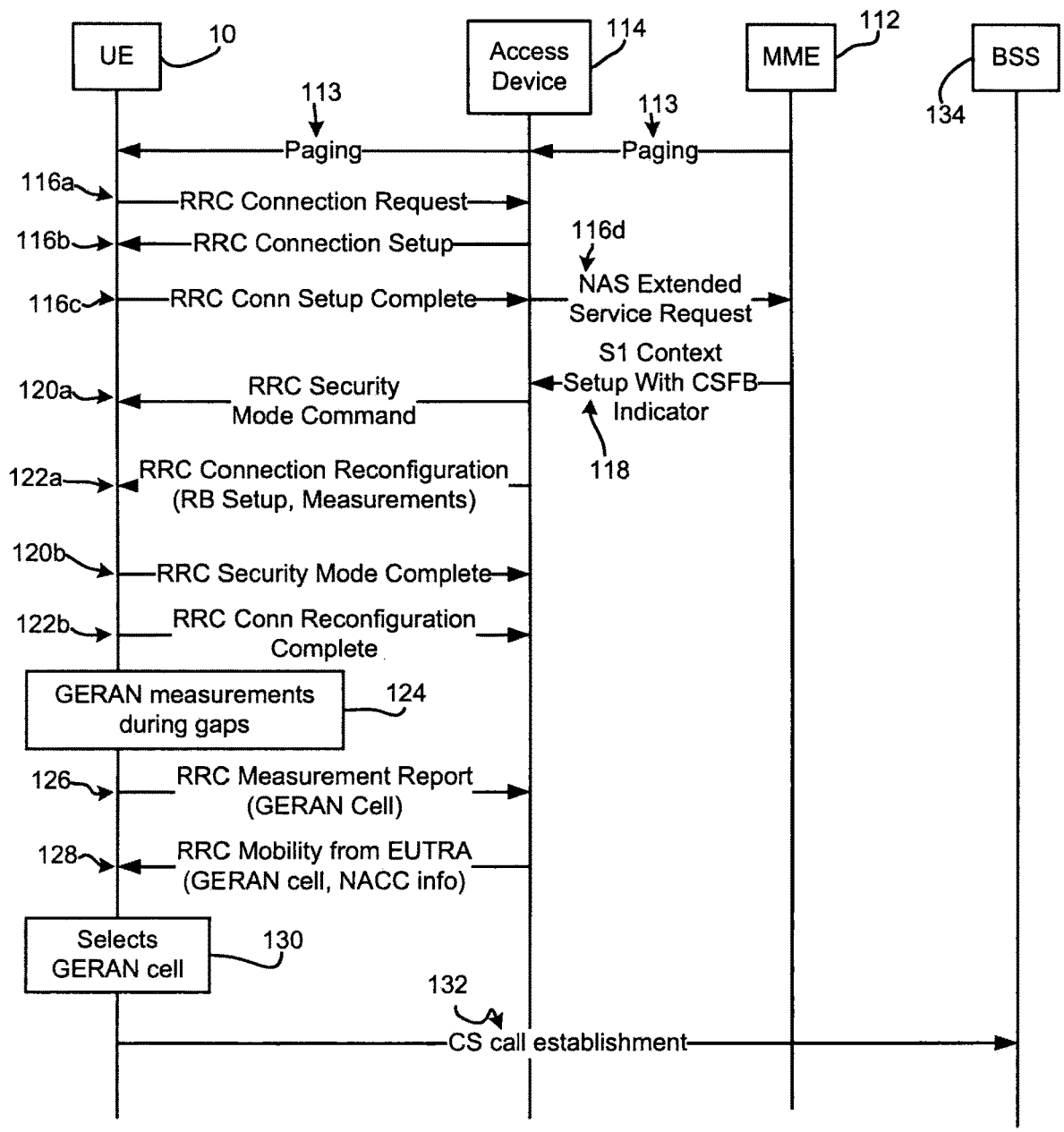
FIG. 3 illustrates a message sequence for implementing CS fallback when UE camped on an E-UTRAN cell or other network cell wishes to initiate a CS voice call or use other CS domain services on another network cell.

FIG. 3 illustrates a message sequence for implementing CS fallback when UE camped on an E-UTRAN cell or other network cell wishes to respond to a paging request associated with an incoming CS voice call or other CS domain service. Although FIG. 3 illustrates CS fallback from an E-UTRAN to a GERAN, fallback to other networks supporting CS services such as UTRAN may be implemented using similar processes. Some differences in the process of FIG. 3 for performing fallback from other PS networks to other CS networks are described below.

In a first step 113, a paging request for a CS voice call, originating from an MSC (not shown), is sent to MME 112 with which UE 10 is registered. The MME translates a Temporary Mobile Subscriber Identity (TMSI) associated with the paging request to the S-TMSI (serving TMSI) identifying UE 10. MME 112 may then page UE 10 using the S-TMSI. MME 112 includes a 'CS domain indicator' in the paging request to notify UE 10 that the paging request originates from the CS domain. Note that step 113 occurs in the case of a UE-terminated call and does not occur in the case of a UE-originated call.

Steps 116*a*-116*d* establish an RRC connection to the E-UTRAN cell on which UE 10 was camped. In step 116*c*, UE 10 sends an RRC Connection Setup Complete message to access device 114. The RRC Connection Setup Complete message may carry a Non-Access Stratum (NAS) Extended Service Request message, which may then be forwarded in step 116*d* from access device 114 to MME 112.

In step 118 an S1 context setup message is transmitted from MME 112 to access device 114 to transfer UE 10 context information. The context setup message may include an indication that CS fallback has been triggered. In step 120*a*, access device 114 transmits a Security Mode Command message to start Access Stratum (AS) security. In step 120*b*, UE 10 sends a Security Mode Complete message to confirm the establishment of integrity protection.

Figure 2:
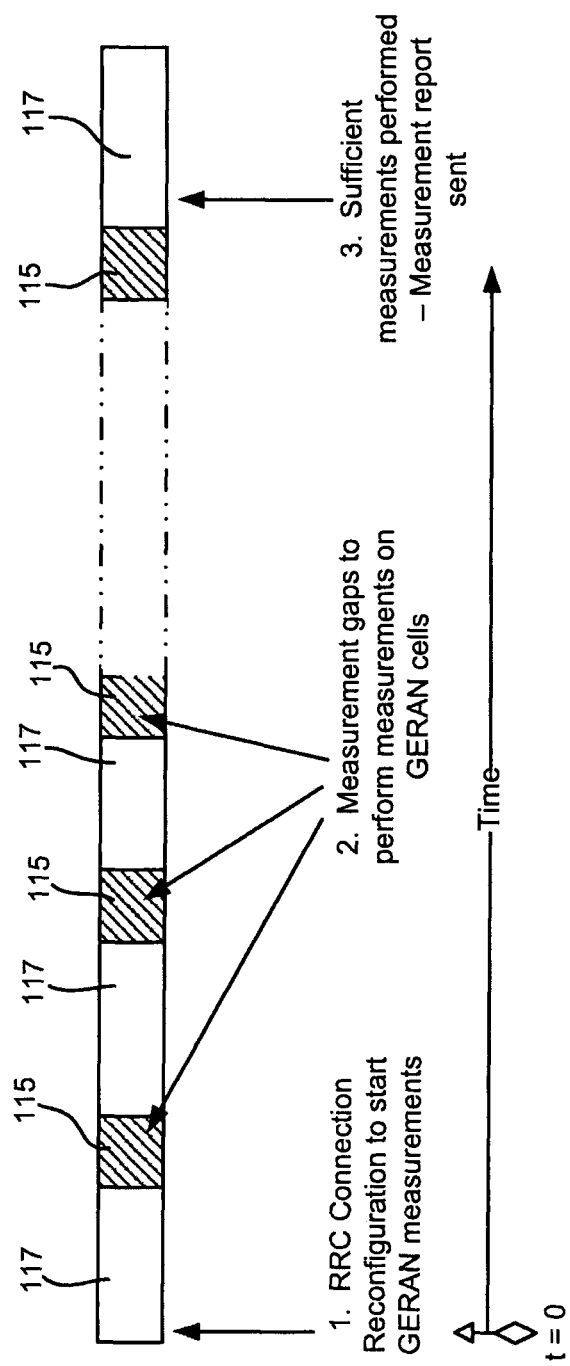
FIG. 2 is an illustration of an exemplary measurement gap pattern that allows the receiver of UE to be temporarily retuned to frequencies of other RATs (e.g., GERAN, UTRAN, or other CS networks) to detect network cells providing CS domain services.

In step 122*a*, access device 114 initiates an RRC Connection Reconfiguration procedure to setup the radio bearers to be used in active mode. In step 122*b*, UE 10 sends an RRC Connection Reconfiguration Complete message to confirm the completion of the procedure. Additionally, as CS fallback has been triggered, access device 114 may use the message in step 122*a*, i.e., RRC Connection Reconfiguration, to configure UE 10 to perform measurements on GERAN cells and to configure measurement gaps in which UE 10 should perform those measurements. Exemplary measurement gap patterns are illustrated in FIG. 2. In step 124, after receiving the measurement gap information in step 122, UE 10 performs measurements on GERAN cells according to the measurement configuration and measurement gaps.

In step 126, after detecting and measuring at least one GERAN cell, UE 10 transmits a measurement report to access device 114. The measurement report may optionally contain measurements for more than one GERAN cell if more than one potential cell is detected.

After receiving the measurement report, access device 114 sends an RRC command called Mobility from E-UTRA Command in step 128 to instruct UE 10 to change to a particular GERAN cell. The RRC command may also include Network Assisted Cell Change (NACC) information (e.g., system information) applicable to the identified GERAN cell. In one aspect, the identified cell is selected from a list of appropriate GERAN cells identified in the measurement report transmitted by UE 10 in step 126.

In step 130, UE 10 selects the identified target GERAN cell, and acquires any system information, if not contained in the RRC command, that is necessary to transfer to the target GERAN cell. The acquisition of system information for the target cell, however, may significantly delay the CS fallback procedure. For example, it may take the UE two or more seconds to acquire all the necessary system information to perform CS fallback to a target GERAN cell, and 640 ms to read the necessary system information from a target UTRAN cell. In poor channel conditions, the UE may have to make multiple attempts to successfully retrieve the system information, further extending the delay.

Finally, in step 132, UE 10 initiates CS signaling on the GERAN cell to Base Station Subsystem (BSS) 134, which may comprise a base station controller (BSC) and base transceiver station (BTS), to complete the answer to paging (in the case of a UE-terminated call) or to originate a call (in the case of a UE-originated call).

As described above, FIG. 3 illustrates a message sequence for implementing CS fallback to a GERAN cell. Depending upon the configurations of the original PS network and the target CS network, several of the steps illustrated in FIG. 3 may be modified. For example, when implementing CS fallback to GERAN using a PS handover, steps 128 and 130 may be replaced with an inter-RAT PS handover to GERAN procedure. Also, when performing CS fallback to UTRAN, steps 128 and 130 may be replaced with an inter-RAT PS handover to UTRAN procedure.

When a PS handover to the target cell is not supported, the access device may trigger an inter-RAT cell change procedure by issuing a Cell Change Order (CCO) in a Mobility From E-UTRA Command to UE 10 during an RRC connection. The inter-RAT CCO optionally includes NACC information, e.g., the system information of the target cell, and may contain a CS Fallback Indicator that indicates to the UE that the CCO is triggered as a result of a CS fallback request. If the inter-RAT CCO contains a CS Fallback Indicator and the UE fails to establish a connection to the target RAT, then the UE may presume that CS fallback has failed. The RRC connection between UE 10 and E-UTRA is released when the cell change procedure is completed successfully.

When, for example, neither PS handover nor inter-RAT cell change are supported by the RAT of the target cell (for example, GERAN or UTRAN), the access device 114 may trigger the CS fallback through redirection by, for example, sending UE 10 an RRC Connection Release message containing redirection information which may be an indication of the target RAT possibly together with an indication of a carrier frequency or frequencies on that target RAT. The UE 10 may use the redirection information in selecting a cell of the target RAT at step 130 and then access the CS services on the selected cell at step 132.

When performing CS fallback to GERAN A/Gb mode, the UE may establish a radio resource connection using the procedures specified in 3GPP TS 44.018 v.8.4.0. The UE requests and is assigned a dedicated channel. After the CS resources are allocated in the GERAN cell, and the main signaling link is established as described in 3GPP TS 44.018, the UE may enter either Dual Transfer Mode (DTM)

possibly requiring support of DTM by both the UE and the new cell or Dedicated Mode and the CS call establishment procedure can take place.

If the MSC serving the GERAN or UTRAN cell is different from the MSC with which the UE was registered when the UE was camped in E-UTRAN, the MSC serving the GERAN or UTRAN cell may reject the requested service. In that case, the UE may perform a Location Update procedure to inform the new MSC of its location or may perform a combined Routing Area/Location Area (RA/LA) update procedure to create an association between the (new) MSC and the SGSN (Serving GPRS Support Node) and to release the existing association between the (old) MSC and the MME.

In the case of UE-terminated calls, paging information may be sent to the MME from the MSC that includes location information necessary to page the UE. The paging information may be sent to one or more network access devices. Upon receiving the paging information, the UE may establish an RRC connection and send an Extended Service Request message with CS fallback indicator to the MME. The MME may then send parameters to the access device to request the access device to move the UE to the specified UTRAN or GERAN cell.

In one aspect, the access device requests measurement reports from UE 10 to determine the appropriate target cell for UE 10. The access device may then trigger an inter-RAT handover to the UTRAN or GERAN, an inter-RAT cell change to the GERAN, or a redirection procedure using, for example, the same mechanisms as described above in FIG. 3. If the LA and/or RA information of the new cell is different from that stored in the UE, the UE may perform a combined RA/LA update procedure if the target system operates in Network Mode of Operation 1 or a Location Area Update (LAU) otherwise.

The UE may then transmit a paging response message to the MSC in the new RAT and enter either DTM or Dedicated Mode (if in GERAN) or RRC_CONNECTED mode (if in UTRAN) and the CS call establishment procedure completes. If the UE is still in UTRAN/GERAN after the CS voice call is terminated, and if an LAU or a combined RA/LA update has not already been performed in the call establishment phase, then the UE may perform either an LAU or the combined RA/LA update procedure.

When UE 10 is in idle mode, UE 10 may be configured to periodically perform idle mode measurements for the purpose of cell reselection. During idle mode measurements, the UE detects candidate cells and measures signal strengths. As such, when UE 10 enters connected mode (e.g., steps 116a-116d of FIG. 3), UE 10 may already have detected and performed measurements on one or more candidate GERAN cells. In one aspect, UE 10 may be configured to store idle mode measurement results associated with detected GERAN cells and later retrieve and use the idle mode measurements when performing CS fallback. The idle mode measurements may replace or speed up connected mode measurements (i.e., step 124 of FIG. 3), thereby minimizing delay in establishing the fallback service.

According to one set of E-UTRA specifications, for example, idle mode measurements may be performed by UE 10 based on system information. For example, System Information Block Type 7 may include GERAN frequencies and allowed network color codes used in the registered PLMN that may be measured by UE 10 while in idle mode. If the system information is not provided, however, UE 10 may instead rely on UE 10's stored knowledge of allocated GERAN frequencies and allowed network color codes used in the registered PLMN to capture idle mode measurements.

In a first implementation of the present system that uses idle mode measurement data captured by UE 10, the message sequence of FIG. 3 is largely unchanged. However, UE 10 is configured to store and retrieve idle mode measurement data. When access device 114 configures or requests UE 10 to perform GERAN measurements at steps 122a-122b of FIG. 3 in connected mode, UE 10 may then respond to the request with the idle mode measurement data rather than actively detect available GERAN cells. Alternatively, should UE 10 undertake connected mode measurements as in step 124 of FIG. 3, UE 10 can minimize the time duration of the connected mode measurement process by using information of the network cells detected during the idle mode measurements. For example, the UE may tune only to those frequencies where the BCCH carrier of allowed GERAN cells was detected during the idle mode measurements. As a result, UE 10 may start measuring the GERAN cells sooner and report the measurement results together with the previously identified BSICs (base station identity codes) as soon as sufficient measurements have been taken. In either alternative, UE 10 may report measurement results to access device 114 upon request from access device 114.

This approach may be implemented by UE 10 without any changes (or only minimal changes) to existing specifications and may be implicitly required by setting particular performance requirements (e.g. setting a maximum value for any delay associated with sending the measurement report) or may be mandated such as by explicit requirements defined in a specification.

Figure 4:
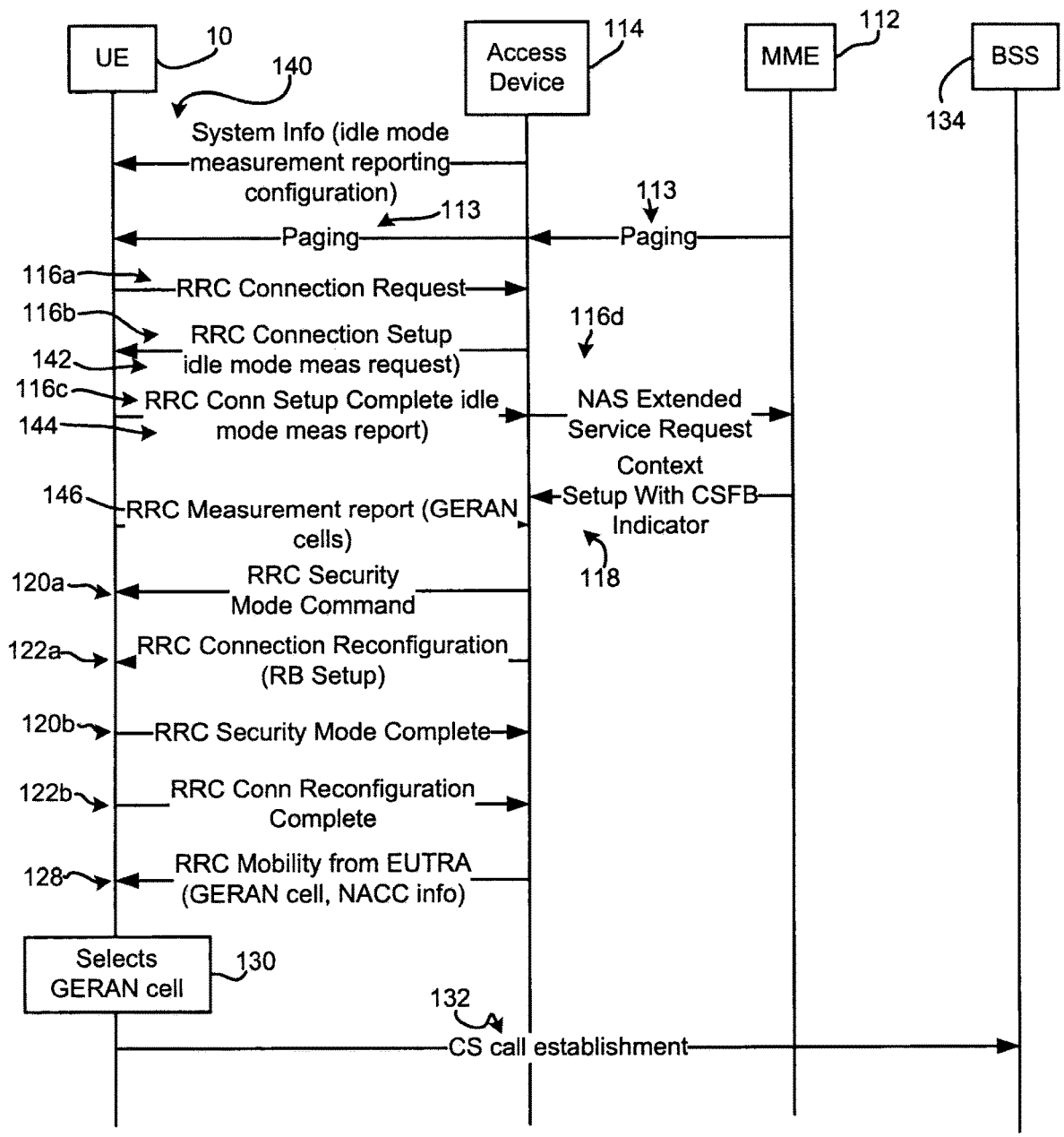
FIG. 4 illustrates a message sequence for implementing CS fallback with the addition of new signaling for transmitting idle mode measurement requests and data between UE and the network.

Alternatively, when using idle mode measurements for CS fallback, new signaling may be added to the message sequence of FIG. 3 to enable access device 114 to specifically request idle mode measurements and for UE 10 to send idle mode measurements to access device 114. FIG. 4 illustrates a message sequence for implementing CS fallback with the addition of new signaling for transmitting idle-mode measurement requests and data between UE 10 and access device 114.

In FIG. 4, access device 114 transmits a message 140 to UE 10 specifically requesting that UE 10 report measurements performed in idle mode. Access device 114 may request the idle mode measurements by sending an 'idle mode measurement reporting configuration' via system information broadcast in step 140 as illustrated on FIG. 4. Alternatively, access device 114 may include an 'idle mode measurement request' in the RRC Connection Setup message as illustrated by step 142 in FIG. 4. Although both steps are shown on FIG. 4, they may be executed independently, with only one of steps 140 and 142 being used to request idle mode measurements.

The request for idle mode measurement results, whether in the system information or in the RRC Connection Setup message or in some other message, may include such additional information as connection quality threshold or signal strength threshold, so that UE 10 only needs to report cells meeting those criteria. The request may also identify particular RATs so that UE 10 would only report measurement results of network cells using those particular RATs. The request may further specify a maximum number of network cells for which UE 10 may report idle mode measurements.

In response to a request for the idle mode measurement reports, UE 10 sends the requested idle mode measurements to access device 114. UE 10 may include an 'idle mode measurement report' in the RRC Connection Setup Complete message as shown in step 144 of FIG. 4. Alternatively, UE 10 may transmit a separate RRC Measurement Report message after the RRC Connection Setup Complete message has been sent, i.e., after an RRC connection has been established, as shown in step 146. Again, although both steps are shown on FIG. 4, they may be executed independently, with only one of steps 144 and 146 being used to transmit idle mode measurements. Whether UE 10 should report the idle mode measurements in or after the RRC Connection Setup Complete message may be specified in the request for idle mode measurements from the E-UTRAN.

The idle mode measurement report may identify the RAT of each network cell measured during the idle mode, the signal strength of each measured network cell such as the strength of the respective pilot signal, the phase information of each measured network cell, identification of the carrier of each measured network cell, the carrier to noise ratio (Ec/No), and/or received signal code power (RSCP) of the common pilot channel (CPICH_RSCP) in measured UTRAN cells, and may provide a list of the network cells measured during the idle mode, optionally grouped by RATs.

The UE may be configured to send idle mode measurement information only as part of a CS fallback procedure. Alternatively, the UE may be configured to send idle mode measurement information even in cases when the UE is establishing a connection to the E-UTRA cell for reasons other than CS fallback (for example when accessing the cell for PS services). Whether to send the idle mode measurement information in all cases or only in the case of a CS fallback may be under the control of the access device and configured in the UE by means of a parameter within the idle mode measurement reporting configuration or idle mode measurement request, which configuration or request may be provided, e.g., in the system information or in the RRC Connection Setup message.

In some cases UE 10 may not have recent measurements of GERAN cells. If so, a measurement report may not be sent to the network (e.g., in steps 144 or 146 of FIG. 4), an empty report may be sent, or the measurement report may include an explicit indication that no measurements of GERAN cells are available. In response, E-UTRAN (e.g., via access device 114 of FIG. 4) may trigger connected mode measurement reporting to obtain the measurements as illustrated by FIG. 3.

Additionally, the idle mode measurements of GERAN cells may not be recent (for example, not received within the last minute) or outdated if UE 10 is in a high mobility state (i.e. fast moving). In that case, UE 10 may include in the measurement report an indication that the idle mode measurements are not very recent (e.g. stale), that the UE is fast moving, or that the measurement report may not be particularly reliable. In response to an indication that the idle mode measurement data may not be reliable, access device 114 may trigger connected mode measurement reporting to obtain more up-to-date measurements from UE 10, for example as illustrated in step 124 of FIG. 3.

It may be preferable that the sending of any such idle or connected mode measurement reports by UE 10 be under control of the network. For example, in some deployment scenarios where the coverage of a small E-UTRAN cell in a rural area is within the coverage of a single GERAN cell, UE 10 will always be directed to the same GERAN cell. In that case, measurement data may be unnecessary—the E-UTRAN cell already knows to which GERAN cell UE 10 would most likely be directed. In many cases, however, such as urban environments where there is a high density of GERAN cells, measurement reports generated by UE 10 enable the network to select the most appropriate cell for a particular UE.

After receiving the information contained in the idle mode measurement report, access device 114 may send an RRC Mobility from E-UTRA command to instruct UE 10 to fallback to one of the GERAN cells reported by UE 10 in the idle mode measurement report. As such, steps 124 and 126 of FIG. 3 may not be executed and are thus not shown in FIG. 4. Ultimately, however, access device 114 may make the determination as to which GERAN cell UE 10 will be directed to. Accordingly, if access device 114 determines that UE 10 should not be directed to any of the cells reported in the idle mode measurement report, access device 114 may request in step 122a that UE 10 perform active measuring and reporting of steps 124 and 126 of FIG. 3 in an attempt to find additional candidate cells.

In another aspect, upon receiving a paging message or a request to initiate a UE-originated call, UE 10 may select a GERAN cell based on previous idle mode measurements without assistance from access device 114. UE 10 may first signal access device 114 of the E-UTRAN cell before connecting to the selected GERAN cell to carry out the call. Alternatively, UE 10 may directly connect to the selected GERAN cell to carry out the call without any signaling to access device 114 of the E-UTRAN cell.

In some cases, to conserve UE power that may otherwise be used for making idle measurements, certain conditions may be specified under which UE 10 does not perform measurements during idle mode. For example, in one particular implementation, idle measurements may not be made if the received power of the serving E-UTRAN cell is greater than a pre-defined threshold, if E-UTRAN is assigned a higher priority than GERAN, if combined attach fails, if the UE supports or prefers voice call only through IMS (IP multimedia subsystem), and/or if IMS voice call is available. Alternatively, UE 10 may determine whether to make idle measurements based upon a combination of one or more factors such as a) whether the serving E-UTRAN is known to not support particular services such as voice (so that CS fallback may be necessary for voice calls), b) whether the serving E-UTRAN is known to provide system information for the target cell (in the manner of NACC making the acquisition of system information from the target RAT unnecessary), c) battery status of UE 10, and d) voice support of UE 10 (for example, laptop data cards may not support voice at all). If any such conditions apply, UE 10 may not have any recent measurements of GERAN cells to be used after UE 10 enters connected mode. In that case, UE 10 may be required to perform connected mode measurements as shown in the CS fallback process of FIG. 3 because idle mode measurements will not be available.

The following approaches may be implemented to increase the likelihood that UE 10 has available idle measurement information. First, UE 10 may voluntarily perform idle measurements on GERAN cells even when not mandated in view of the current operating conditions. Although this option may reduce the measurement delay associated with CS fallback, it may negatively affect UE 10's power consumption. Second, UE 10 may perform measurements on GERAN cells shortly after it has received the paging message illustrated in step 113 of FIG. 3 for UE-terminated calls, or after receiving the request to initiate a UE-originated call, and before UE 10 enters connected mode. In that case, UE 10 may first continuously perform sufficient GERAN measurements and only then initiate the connection to the E-UTRAN cell (e.g., steps 116a-116d of FIG. 3). Although this implementation may add some delay to the CS fallback procedure, the extra delay due to the short period of continuous measurements will generally be less than the total delay associated with performing the measurement during measurement gaps in connected mode.

In addition to performing cell reselection measurements of GERAN cells while in idle mode, UE 10 may also attempt to acquire in advance system information of the GERAN cells or other CS network cells that are most likely to be used in the case of CS fallback to shorten the CS fallback process. For example, UE 10 may be configured to acquire system information of the strongest GERAN neighbor cell while in idle mode. Then UE 10 may not need to retrieve the same system information during the CS fallback procedure as in, for example, step 130 of the sequence of FIG. 3, and can use the previously acquired system information to speed up the fallback process.

UE 10 may be further configured to implement appropriate logic to determine whether to acquire system information for one or more neighbor cells while in idle mode. For example, the determination may depend on a) whether the serving E-UTRAN is known to not support particular services such as voice (so that CS fallback may be necessary for voice calls), b) whether the serving E-UTRAN is known to provide system information for the target cell (in the manner of NACC making the acquisition of system information from the target RAT unnecessary), c) battery status of UE 10, d) voice support of UE 10 (for example, laptop data cards may not support voice at all), e) number of detected cells (system information for a high number of cells requiring more time and battery power to receive and decode, and a high number of cells making it more likely that the eventual target cell will be one for which the UE has not yet acquired system information) or any combination of these. By limiting the circumstances under which UE 10 will attempt to acquire system information, battery consumption for UE 10 may be reduced compared to a process whereby such neighbor cell system information is always received and decoded.

In addition to minimizing occurrences of connected mode measurements by using idle mode measurement data, the present system may be made more efficient by further minimizing the duration of any connected mode measurements that must be collected. In many cases, significant delay associated with connected mode measurements may result from the use of measurement gap patterns that give only a limited amount of time for UE 10 to perform connected mode measurements, for example, as shown in FIG. 2.

In one aspect, UE 10 may be configured to dedicate more time to connected mode measurements than are allocated by the existing measurement gap patterns described above (such as illustrated in FIG. 2.) In the CS fallback message sequence of FIG. 3, for example, there is no ongoing voice call or data activity at the time of initiating the CS fallback process because UE 10 has just left idle mode. As such, UE 10 may implement an enhanced measurement gap schedule to increase the amount of time UE 10 allocates to performing any required measurements. After UE 10 has performed sufficient measurements to detect one or more candidate cells, UE 10 may cease the measurement process and send a measurement report to access device 114.

Figure 5:
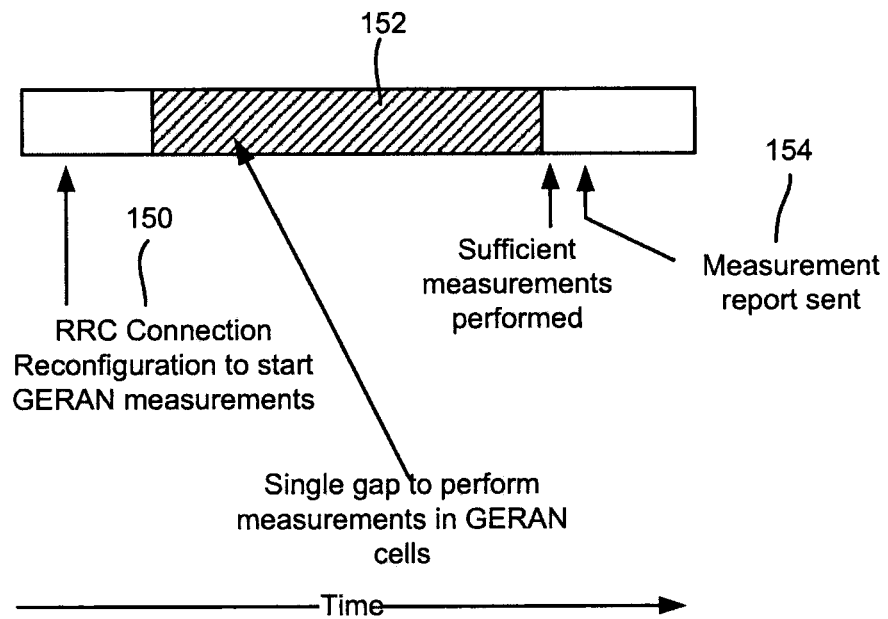
FIG. 5 is an illustration of an exemplary measurement gap pattern that improves measurement efficiency.

FIG. 5 is an illustration of an exemplary measurement gap pattern that may be implemented by UE 10 for efficient measurements. In FIG. 5, an RRC Connection Reconfiguration message is transmitted to begin the measurement process in step 150. A single contiguous measurement gap 152 is then defined during which UE 10 performs measurements for GERAN cells. After UE 10 has detected one or more candidate cells, UE 10 transmits the measurement results to the access device (e.g., an E-UTRAN eNB) in step 154. Note that in the present implementation, even if an ongoing data session is active, the CS fallback process may still be more efficient using a longer and continuous measurement gap as illustrated in FIG. 5 instead of smaller distributed gaps as shown in FIG. 2.

Although FIG. 5 illustrates a single contiguous period of time during which UE 10 may perform measurements, efficiency may be optimized with variations of the gap pattern illustrated in FIG. 2, e.g., to define longer or extended but still distributed measurement gaps.

In some cases, the radio coverage of an E-UTRAN or other PS network cell may be entirely within the radio coverage of a single GERAN, UTRAN, or other CS network cell. In such a case, the provision of measurement reports by UE 10 to access device 114 may be unnecessary because access device 114 may direct UE 10 to the overlapping CS network cell without requiring any additional measurement information from UE 10. Sometimes there may be more than one GERAN, UTRAN, or CS network cell that has overlapping radio coverage with the E-UTRAN or other PS network cell. In that case it may be sufficient that there exists at least one CS network cell whose radio coverage is equal to or a superset of the radio coverage of the E-UTRAN cell—the access device may direct UE 10 to any of the overlapping GERAN cells without requesting measurement data from UE 10. In the case of a UE-terminated call, for example, when transmitting the paging message, access device 114 may additionally transmit (either within the paging message or as a separate transmission or transmissions) an identity of a specific GERAN cell to which UE 10 should move, and/or system information corresponding to the specific GERAN cell. This method need not be limited to the specific radio coverage scenario described above, but may be beneficial in scenarios where i) indicating a single target cell is likely to result in fallback success in a high number of cases, ii) only one cell is available to provide CS services (regardless of the coverage of that cell), or iii) the goal is simply to minimize configuration effort associated with the access device, regardless of the relative coverage.

Alternatively, the identity and system information of the target GERAN cell may be included in the system information of the E-UTRAN cell or other PS network cell. For example, a CSFB System Information Block (SIB) may be added to the E-UTRAN cell's system information to carry a GERAN cell identity and the GERAN cell's system information. In that case, the CSFB SIB indicates that whilst camped on the E-UTRAN cell the contents of the SIB shall be considered by the UE 10 for CS fallback. UE 10 can use the CSFB SIB in several exemplary scenarios as follows:

a) UE 10 may be camped on an E-UTRAN cell in an RRC_IDLE state. If UE 10 has to perform a UE-originated CS call using CS fallback, then UE 10 may move to the cell indicated by the CSFB SIB and initiate a CS call using that network cell, without accessing the E-UTRAN cell.

b) UE 10 may be camped on an E-UTRAN cell in an RRC_IDLE state when receiving paging information indicating a CS fallback UE-terminated call. Upon receiving the paging information, UE 10 moves to the cell indicated by the 'CSFB SIB' and responds to the paging information on the target cell.

Alternatively, an additional field may be added to the paging message that specifies 'Use CSFB SIB'. In response to receiving the 'Use CSFB SIB' indication, UE 10 moves to the cell indicated by the 'CSFB SIB'. If, however, the 'Use CSFB SIB' indication is not received, then UE 10 may respond to the paging information as illustrated in FIG. 3, thereby allowing, for example, the E-UTRAN to request idle or connected mode measurements and decide to which cell to direct UE 10.

c) UE 10 may be connected to an E-UTRAN cell in an RRC_CONNECTED state. If UE 10 has to perform a UE-originated or UE-terminated CS call using CS fallback, the Mobility From E-UTRA Command message need not provide complete network assistance information such as the system information of the target GERAN cell. Instead the Mobility From E-UTRAN Command message may have a single field that indicates 'Use CSFB SIB'. In that case, because UE 10 has already acquired the 'CSFB SIB' on that cell, UE 10 moves to the target cell as if it has received complete network assistance information in the handover message.

d) UE 10 may be connected to an E-UTRAN cell in an RRC_CONNECTED state. Upon receipt of paging information or a requirement to initiate a UE-originated call, UE 10 performs local release, and selects the indicated GERAN cell without the signaling in the E-UTRAN cell.

A similar process may be used in the case of a UE-originated call (including an emergency call) as soon as access device 114 is aware that the reason for the connection request is a CS fallback call.

If more than one RAT may potentially provide the fallback service (such as a circuit-switched voice call), the system information of the E-UTRAN or other PS network cell may identify one or more target cells for each such RAT. Certain criteria, such as radio coverage, connection quality, etc., may be used in selecting the most likely fallback cells to identify in the system information.

With E-UTRAN it is possible to connect a single E-UTRAN radio access network to more than one core network belonging to different operators. This allows those operators to share the running costs associated with the radio access network. In such a case, the E-UTRAN cell will broadcast the Public Land Mobile Network (PLMN) identity of each of the operators and the UE may register to the core network of just one of the operators or PLMNs. Although operators may share the E-UTRAN radio access network, they may not share their UTRAN, GERAN or other networks that may be used for CS fallback, or may have different agreements with operators of the UTRAN, GERAN or other networks that may be used for CS fallback. Hence, an operator that supports CS fallback from a shared E-UTRAN radio access network may require that a mobile station registered with that operator perform CS fallback to a particular target UTRAN cell, GERAN cell or other cell, which may be different from the target cell preferred by a second operator for mobiles registered with that second operator when such mobiles perform CS fallback. In such a case, the CSFB System Information Block may identify multiple target cells (which may be UTRAN, GERAN or other cells) and corresponding system information for those cells belonging to (or preferred by) each of the operators sharing the E-UTRAN radio access network. When the UE performs CS fallback using the information from the CSFB SIB, the UE may select a cell identified in the CSFB SIB corresponding to the operator or PLMN with which the UE is currently registered.

Figure 6:
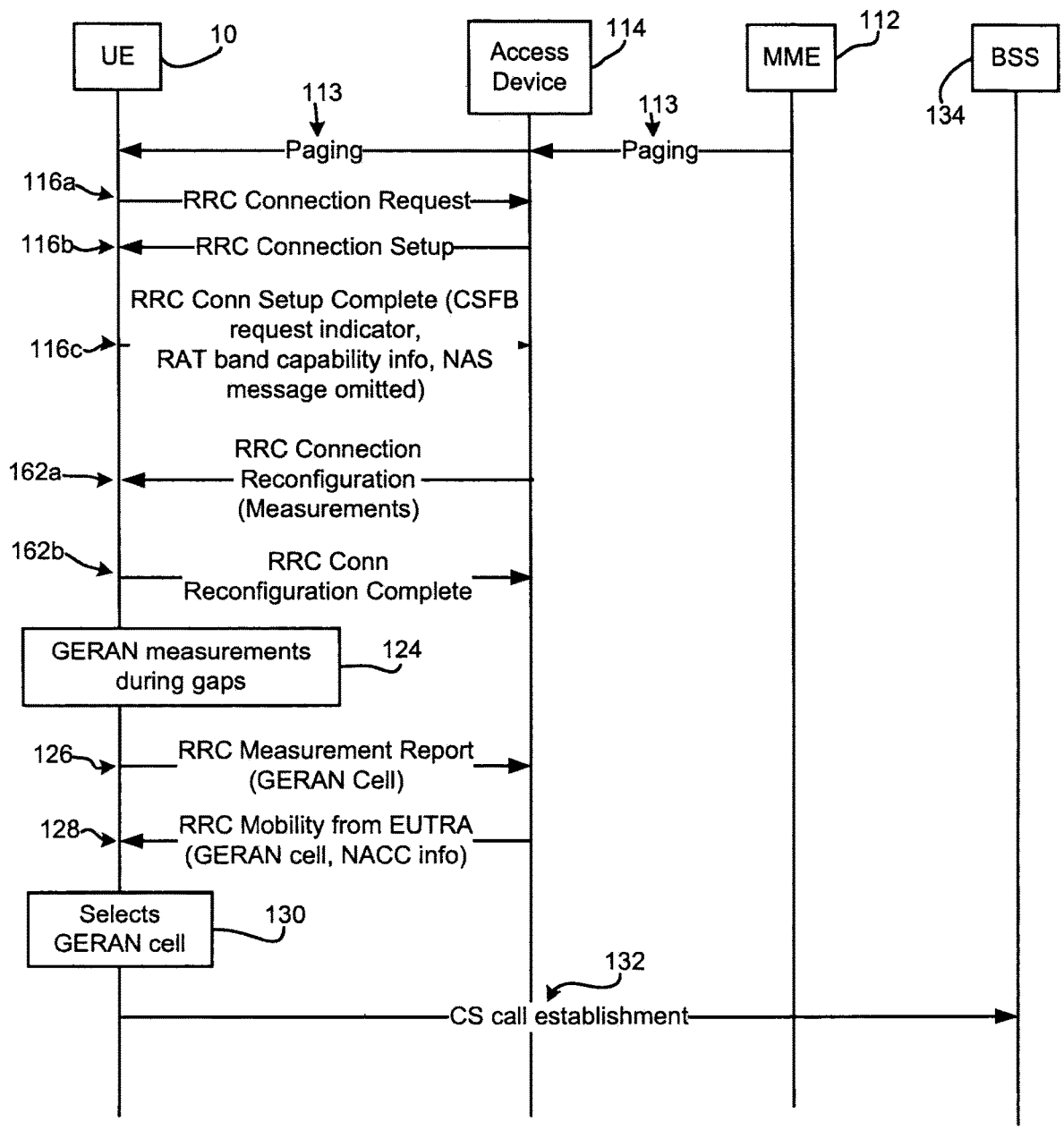
FIG. 6 is an illustration of an alternative message sequence for implementing CS fallback, wherein the alternative sequence eliminates some of the communication steps between an access device and an MME.

Turning to FIG. 6, an alternative message sequence for implementing CS fallback is illustrated. The process eliminates some of the communication steps between access device 114 and MME 112. The process illustrated in FIG. 6 is applicable to CS fallback to GERAN using inter-RAT cell change (optionally with NACC information), and also applicable to CS fallback using redirection to a GERAN, UTRAN or another network cell. The process may also be made applicable to CS fallback to UTRAN with the option of using inter-RAT cell change to UTRAN. The message sequence of FIG. 6 includes the following steps:

In a first step 113, a paging request for a CS voice call, originating from an MSC (not shown), is sent to MME 112 with which UE 10 is registered. This step is largely unchanged from that of FIG. 3. Furthermore, as in the case illustrated in FIG. 3, this step may not occur in the case of a mobile-originated call.

Steps 116*a*-116*c* establish an RRC connection on the E-UTRAN cell on which UE 10 was camped. In the final sub-step 116*c*, UE 10 sends an RRC Connection Setup Complete message to access device 114, but the message is modified compared to that shown in FIG. 3. For example, the NAS message (NAS Extended Service Request) is omitted from the RRC Connection Setup Complete. The NAS message would ordinarily be communicated to MME 112 and so is not required when there is no communication between access device 114 and MME 112.

The RRC Connection Setup Complete may include an indicator that the RRC Connection is being requested for the purpose of CS fallback. The indication could also be implicit from the absence of an NAS message. The RRC Connection Setup Complete may also include some UE capability information such as a list of the RATs and bands supported by UE 10. The amount of UE capability information provided to access device 114 may be less than the amount that would normally have to be known by access device 114 for the purposes of providing PS services from access device 114. In the sequence shown in FIG. 3, for example, access device 114 obtains UE capability information from MME 112 in the S1 context setup message at step 118 of FIG. 3. In cases where there is no such communication between access device 114 and MME 112, as illustrated in FIG. 6, the UE capability information or some subset of the UE capability information may be provided by UE 10 over the radio interface. Accordingly, in FIG. 6, there is no S1 context message communicated from MME 112 to access device 114. In FIG. 6, a Security Mode Command message to initiate AS integrity protection may be omitted compared to the message sequence illustrated in FIG. 3, because security context information such as security keys required for AS integrity protection must be received from the MME, and there is no communication between MME 112 and access device 114.

In the example shown in FIG. 6, RRC Connection Reconfiguration steps 162*a* and 162*b* are modified as compared to the sequence of FIG. 3. Steps 162*a* and 162*b* do not establish user plane radio bearers, which may only be established on request of the MME 112.

Steps 124, 126, 128 and 130 may be generally the same as those of FIG. 3. Some standard specifications may require that the RRC Mobility from E-UTRA Command message be sent with integrity protection which implies that the message can only be sent after a Security Mode Command message has already been transmitted. This requirement may be lifted so that when undertaking CS fallback the RRC Mobility from E-UTRA Command message can be sent without integrity protection. As a result, step 128 of FIG. 6 may be modified.

In an example involving emergency calls, UE 10 may be in idle mode camped on an E-UTRAN cell and not be registered with a CS network cell (e.g., UE 10 has not successfully performed a combined attach procedure). If so, emergency calls may not be supported on the E-UTRAN and UE 10 needs to move to a UTRAN or GERAN cell to initiate an emergency CS voice call. UE 10 may include an 'emergency call' cause value in the RRC Connection Request message. Additionally, an 'emergency CSFB request indicator' may be included in the RRC Connection Setup Complete message. As mentioned above, in this emergency CS fallback scenario, the RRC messages may have to be sent without integrity protection. In the alternative, UE 10 may directly re-select a UTRAN or GERAN cell to initiate the emergency CS voice call without signaling the E-UTRAN cell.

Figure 7:
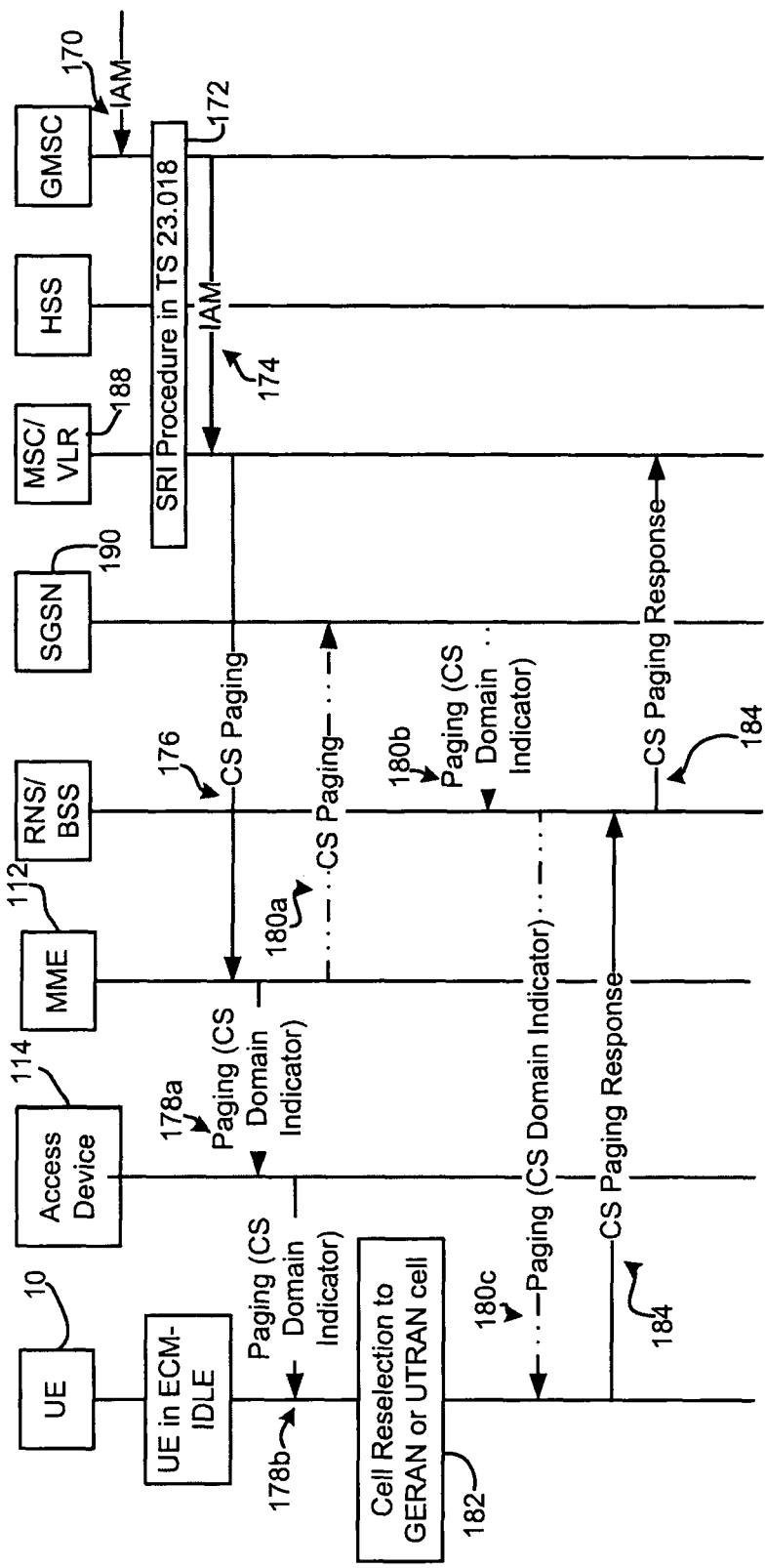
FIG. 7 illustrates a communication flow diagram for implementing a UE-terminated call when Idle mode Signaling Reduction (ISR) is active.

In one specific implementation, as may be required by 3GPP TS 23.272, subclause 7.7, when a request for a mobile-terminated service arrives in the network, the MSC sends a paging message via SGSN to the MME. The MME pages in the tracking areas (TAs) where UE 10 is registered, and also requests via the S3 interface of the SGSN that has an Idle mode Signaling Reduction (ISR) relation with the MME to page UE 10 in the RA. When UE 10 receives the paging by the MME, UE 10 may reselect a cell of the CS network with which the UE is registered and respond to the paging by the SGSN to avoid Extended Service Request procedure and the subsequent cell change procedure. FIG. 7 illustrates a communication flow diagram for handling a UE-terminated call when ISR is active.

Referring to FIG. 7, in steps 170 to 176 a UE-terminated call arrives in MSCNLR 188 and the CS paging message is forwarded to MME 112. In steps 178*a* and 178*b* MME 112 sends the CS paging message to each access device 114 serving the TAs to which UE 10 is registered.

In step 182, upon receipt of the CS paging information, UE 10 reselects a cell under the routing area (RA) with which UE 10 is currently registered if ISR is active. To realize faster inter-RAT reselection, UE 10 may use measurements and any system information of candidate cells (in particular to ensure that the cell of which reselection is performed belongs to the same RA with which the UE 10 is registered). Meanwhile, in steps 180*a*-180*c*, MME 112 forwards the CS paging information to the associated SGSN 190 if ISR is active and SGSN 190 pages the mobile in the RA with which UE 10 is registered. Finally, in step 184, UE 10 receives the CS paging information from steps 180*a*-180*c* and responds to establish a UE-terminated call. This approach may be particularly beneficial in cases where the core network operates in Network Mode of Operation (NMO) 1.

Figure 8:
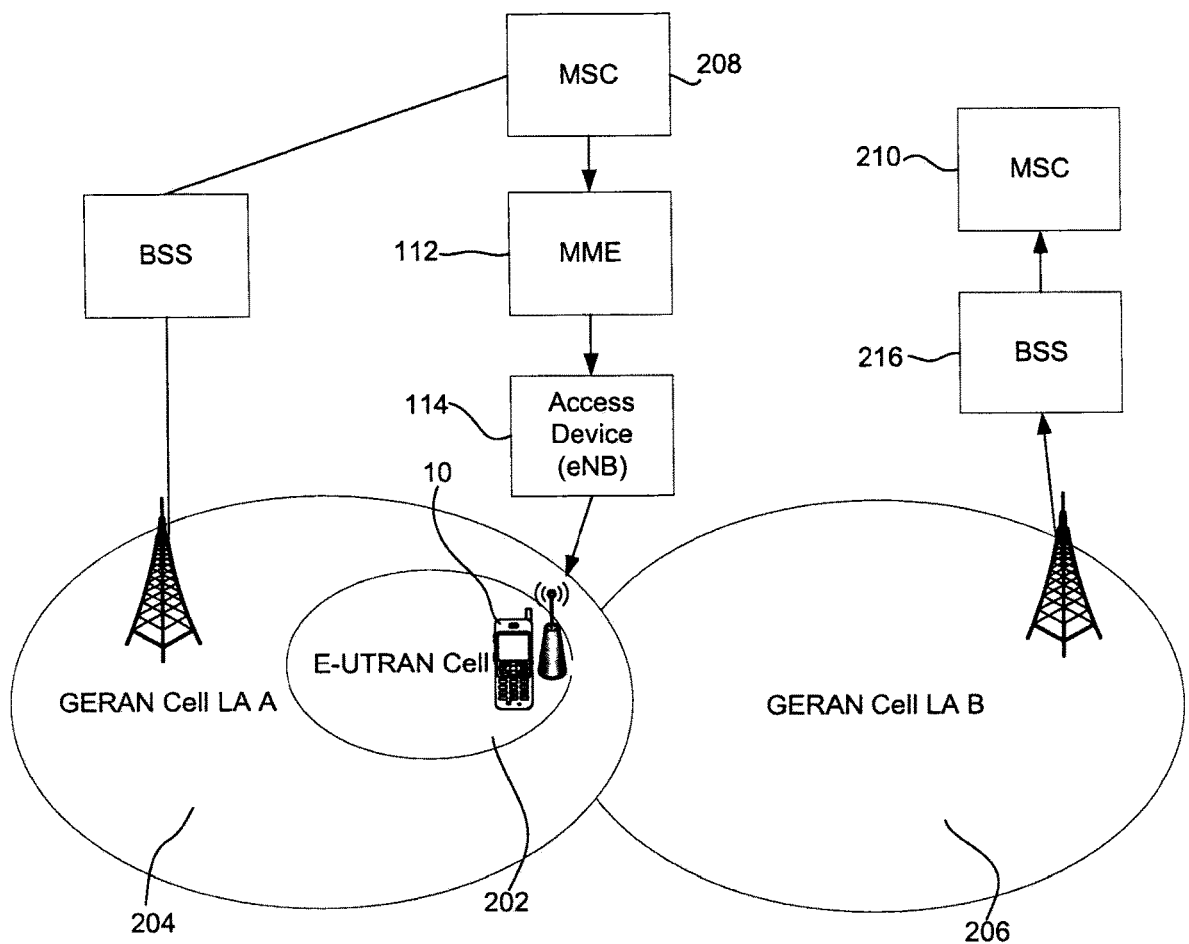
FIG. 8 is an illustration of a network configuration wherein UE is camped on an E-UTRAN cell and is also located close to the boundaries of the radio coverage of two GERAN cells.

In some cases, during CS fallback, UE 10 may be directed to a GERAN cell having a different LA from the LA in which UE 10 was registered when camped on the E-UTRAN or another PS network. FIG. 8 illustrates such an example. As shown in FIG. 8, UE 10 is located close to the boundaries of the radio coverage of GERAN cells 204 and 206. GERAN cells 204 and 206 are respectively associated with MSCs 208 and 210 and respectively have LAs A and B. UE 10 is camped on E-UTRAN cell 202 which is associated with LA A. Thus, when UE 10 performs the combined registration, such as combined attach or combined tracking area update, via the E-UTRAN cell, UE 10 becomes registered in LA A under MSC 208.

When a UE-terminated CS call arrives in MSC 208, the paging message takes the route through MME 112, access device 114, and E-UTRAN cell 202 to UE 10. However, if the CS fallback procedure directs UE 10 to GERAN cell 206, for example because GERAN cell 206 was reported as the strongest GERAN cell, the page response may take the route through GERAN cell 206, through BSS 216 to MSC 210. As a result, the page response will return to MSC 208, which may result in call failure or other CS domain service setup failure.

The problems associated with UE 10 being directed to a GERAN cell belonging to the wrong LA may be mitigated by informing the E-UTRAN or other PS network of UE 10's current registered LA. That information of the current registered LA can then be used to direct UE 10 to a GERAN or other CS network cell having the same LA.

In one implementation of the present system, the identification of the LA in which UE 10 is registered is provided to access device 114 by MME 112 through, for example, the S1 context setup message from MME 112 to access device 114 in step 118 of FIG. 3. Alternatively, information of the current registered LA may be provided directly by UE 10. If provided by UE 10, the information of the current registered LA may be transmitted at any stage in the message sequence prior to access device 114 sending the RRC Mobility from E-UTRA command in step 128. For example, any of the messages from UE 10 to access device 114 (including the RRC Connection Setup Complete or the RRC Measurement Report) may be configured to include the registered LA information. In particular, the registered LA information may be included in the RRC Connection Setup Complete message in the case that measurement information, obtained while UE 10 is in idle mode, is added to the RRC Connection Setup Complete.

Upon receiving the registered LA information from UE 10 and, optionally, upon receiving an RRC Measurement Report from UE 10 that contains more than one GERAN cell, access device 114 may select a GERAN cell that belongs to the registered LA for UE 10. After selecting the GERAN cell, access device 114 identifies that GERAN cell in a message to UE 10, such as the RRC Mobility from E-UTRA command or the RRC Connection Release message. Access device 114 may also provide the system information of the GERAN cell in such a message. As a result, UE 10 transfers to a GERAN cell having the same LA as the LA in which UE 10 is registered. In some cases, access device 114 will use additional criteria in the selection of a suitable cell for CS fallback, for example, access device 114 may only select from cells that have signal strength greater than a given threshold. In some cases, different signal strength thresholds may be defined for normal versus emergency calls.

The present system may also be configured for network deployment scenarios where a single MSC controls multiple LAs. In such a deployment, it may be possible that a paging response reaches the correct MSC, even if it is sent via a cell having an LA different from the LA in which the UE is registered, if the different LA and the registered LA are both managed by the same MSC. In such a case, access device 114 may take into account this network configuration and consider multiple LAs when determining which target GERAN cell to direct UE 10 towards in order to maximize the probability of fallback success. MME 112 may also identify the LA in which UE 10 is registered, either from system knowledge or from a message received from UE 10, and provide the identity of the LA in which UE 10 is registered to access device 114 to facilitate the selection of target cells.

In another implementation, the E-UTRAN may identify more than one target cell for UE 10 to select from. In addition or in the alternative, the E-UTRAN may provide system information of the more than one cell to UE 10. Such identifications or system information of the more than one GERAN cell may be included in a message to UE 10 to release the connection between UE 10 and the E-UTRAN access device. For example, the RRC Mobility from E-UTRA Command message may be modified to identify more than one GERAN cell, may identify the carrier frequencies of the more than one GERAN cell, and may include system information for the more than one GERAN cell. Upon receiving the message from the E-UTRAN identifying more than one GERAN cell, UE 10 selects one of the identified GERAN cells that belongs to the LA in which UE 10 is currently registered. To determine which of the included GERAN cells belong to the registered LA, UE 10 may inspect any available system information applicable to the cells, obtained either from NACC information, i.e., the system information of the target cells included in the message from the E-UTRAN, or from reading the system information directly from the cells. In addition or in the alternative, UE 10 may select one of the identified GERAN cells based on previous idle mode measurements.

The present system may also be configured for network deployment scenarios where a single MSC controls multiple location areas. In that case, UE 10 may be additionally configured to prefer cells having a different LA but which are managed by the same MSC over those cells managed by different MSCs.

UE 10 may also be configured to be aware of the LA of candidate GERAN cells prior to reporting idle or connected mode measurements. In that case, UE 10 may apply a filtering or biasing rule to preferentially report available cells of the same LA in which UE 10 is currently registered. This may maximize the probability that access device 114 selects a target cell which is in the same LA as that in which UE 10 is currently registered. In performing filtering or biasing, UE 10 may take into account an awareness of which of multiple LAs are served by the same MSC so as to maximize the possibility that access device 114 selects a target cell whose LA is the same as that in which UE 10 is currently registered, or whose LA is managed by the same MSC as that with which UE 10 is currently registered.

In conventional network implementations, the target system (i.e. the one that provides the CS service) may not be aware that the call being setup results from a CS fallback procedure. If the target system were to be aware that the call results from CS fallback, however, the time required for call establishment via CS fallback may be reduced. Depending upon the network configuration, the target system may be made aware of the CS fallback status of a call either by the UE or, in the case of a PS handover, by means of preparation phase signaling (for example, in the case of fallback from an E-UTRA cell to a GERAN cell). In particular, the UE may indicate in a connection setup message, such as an RRC connection request message or an RRC connection setup complete message, to the target system that the connection is a fallback connection to obtain a CS fallback service. Alternatively, the E-UTRA cell may inform the GERAN cell that the UE is seeking a fallback connection with the GERAN cell, and may do so by signaling from the eNB associated with the E-UTRA cell or signaling from the MME associated with the E-UTRA cell.

When the target cell is aware of the purpose of the connection request from the UE, the target cell may permit the UE to go through an expedited access procedure to receive an assignment of dedicated channels. The expedited access procedure is in contrast with a normal access procedure a mobile device needs to go through when establishing a connection with the target cell other than a fallback connection. Compared to the normal access procedure, an expedited access procedure may require less signaling or fewer steps. For example, a mobile device performing an expedited access procedure may be given higher priority.

Still taking GERAN as an example, to speed up call establishment in GERAN, a Traffic CHannel (TCH), instead of a stand-alone dedicated control channel (SDCCH), may be assigned in direct response to a call connection request identified as a request for a fallback connection, thereby eliminating the otherwise necessary step of signaling on the SDCCH before assignment of TCH. After assigning the TCH, call establishment signaling may be performed using Fast Associated Control CHannel (FACCH) signaling associated with the TCH, rather than on the SDCCH. Alternatively, rather than execute Authentication and Ciphering procedures in the target system as part of call setup, any necessary parameters for Authentication and Ciphering may be sent as part of the handover procedure (i.e., as a Cipher mode setting and RAND).

Call setup signaling over GSM, for example, may take place on either the FACCH (Fast Associated Control Channel) or the SDCCH (Stand Alone Dedicated Control Channel). Usually the setup occurs on the SDCCH, after which the network assigns UE 10 to a traffic channel on which speech frames are transferred.

Figure 9:
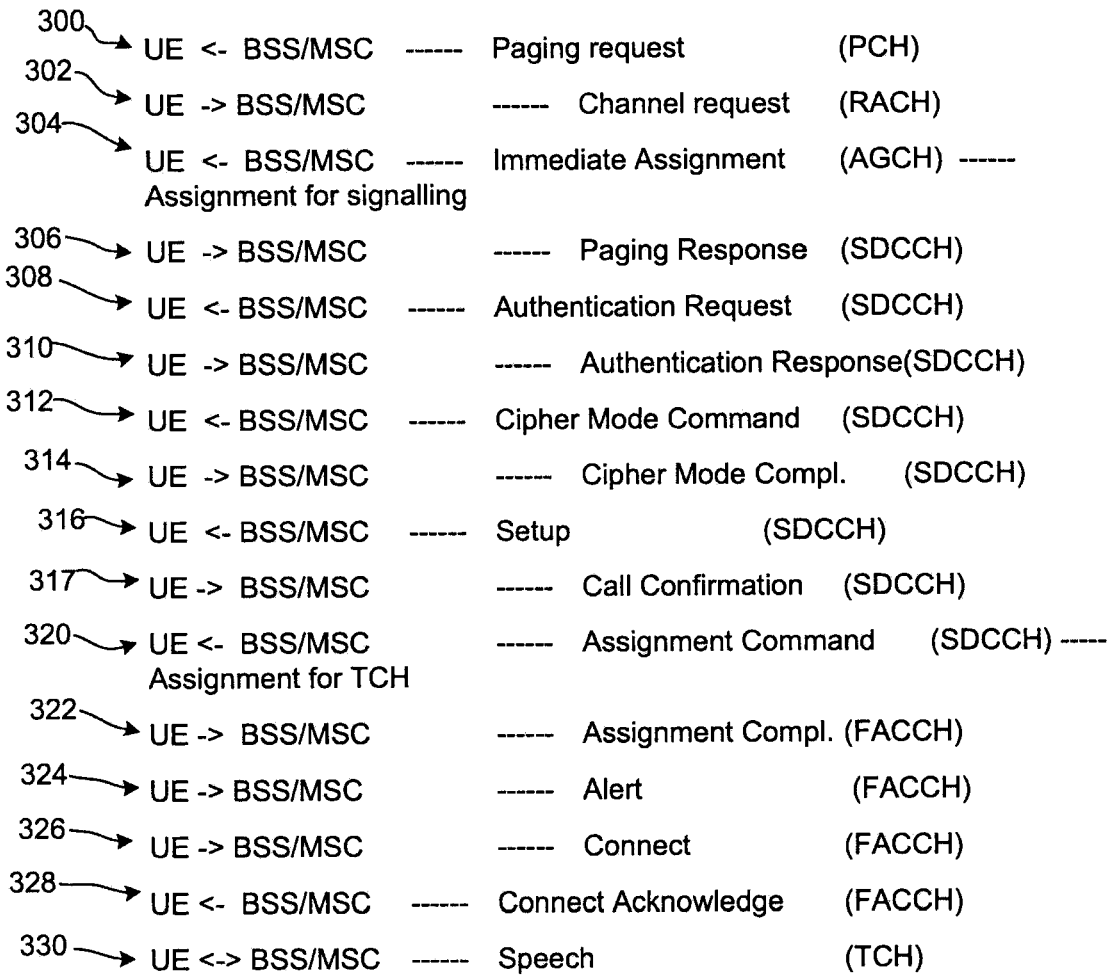
FIG. 9 illustrates a conventional message flow for call setup on a CS network for a UE-terminated call using the Stand alone Dedicated CHannel (SDCCH)

FIG. 9 illustrates a conventional message flow for implementing call setup on a CS network for a UE-terminated call using the SDCCH. In step 300 a paging request is sent from the BSS/MSC to UE 10 via the Paging Channel (PCH). In step 302, in response to the paging request, UE 10 transmits a channel request to BSS/MSC using Random Access CHannel (RACH) signaling. In step 304, an assignment message is transmitted from BSS/MSC to UE 10 via Access Grant CHannel (AGCH) signaling. The rest of the call setup signaling in FIG. 9 occurs using the SDCCH. In steps 306-314 paging responses, authentication processes and the cipher mode are setup in several communications between UE 10 and BSS/MSC. In steps 316-320 the call is setup via SDCCH signaling. In steps 322-328 a connection for the voice call is established using the FACCH signaling. Finally, in step 330, after the call is setup ongoing voice communication occurs between UE 10 and another UE through BSS/MSC using TCH signaling.

In contrast, FIG. 10 illustrates a message flow for implementing call setup on a CS network for a UE-terminated call using FACCH signaling. When FACCH signaling is used, UE 10 may immediately be assigned a traffic channel using AGCH signaling as illustrated by step 332 of FIG. 10, in place of the two step procedure described above (i.e. signaling followed by TCH). The assignment allocates resources on the TCH/F directly making the second step unnecessary. In steps 334-344 FACCH signaling is used to process the response to the paging request, setup the call, and establish a connection. In step 346, ongoing voice communication occurs between UE 10 and another UE through BSS/MSC using TCH signaling. FIG. 10 also illustrates optional step 348 involving a channel modify message sent using FACCH signaling from BSS/MSC to UE 10. This message may be set to UE 10 by the network (e.g., BSS/MSC) to specify MultiRate Configuration Informational Element (IE) such as for specifying AMR parameters.

It is important to note that FACCH is an in-band signaling channel created using resources that may otherwise be assigned to the TCH. The in-band signaling approach (instead of the out-band signaling over SDCCH illustrated in FIG. 9) coupled with the removal of the Authentication/Ciphering procedure, may reduce the overall call set-up time. Unfortunately, one drawback of this approach is that there may be no option available (in the Immediate Assignment message) to indicate the AMR speech coding option (i.e. MultiRate Configuration IE) earlier on in the call setup. This may be resolved, however, by the network sending the Channel mode Modify message after the call is connected.

There may be additional benefits if the target system is aware that the call is a CS fallback call. For example, redirection back to E-UTRAN at call termination may be applied to CS fallback calls. Because the mobile was camped on E-UTRAN when the CS fallback process was initiated, it is may be optimal that UE 10 be returned to and camp on an E-UTRAN cell, and possibly the original E-UTRAN cell. To do so, the GERAN cell may, at the release of fallback connection with UE 10, indicate to UE 10 that UE 10 should be redirected to and re-select an E-TRAN cell. The indication may identify the E-UTRAN or the original E-UTRAN cell, and may even contain system information of the original E-UTRAN cell. Alternatively, UE 10 may store the identity of the E-UTRAN or the original E-UTRAN cell and/or the system information of the original UTRAN cell, thereby enabling a re-selection of the original E-UTRAN cell upon receiving the redirect indication from the GERAN cell. Also, appropriate settings of priorities for autonomous reselection may be configured for UE 10 to increase the probability that it reselects to E-UTRAN following the call. In particular, if UE 10 receives a higher priority of cell reselection to the E-UTRAN than to the GERAN, once the fallback connection with the GERAN cell is released, UE 10 may first look for an E-UTRAN cell and reselect it if one is found.

Figure 11:
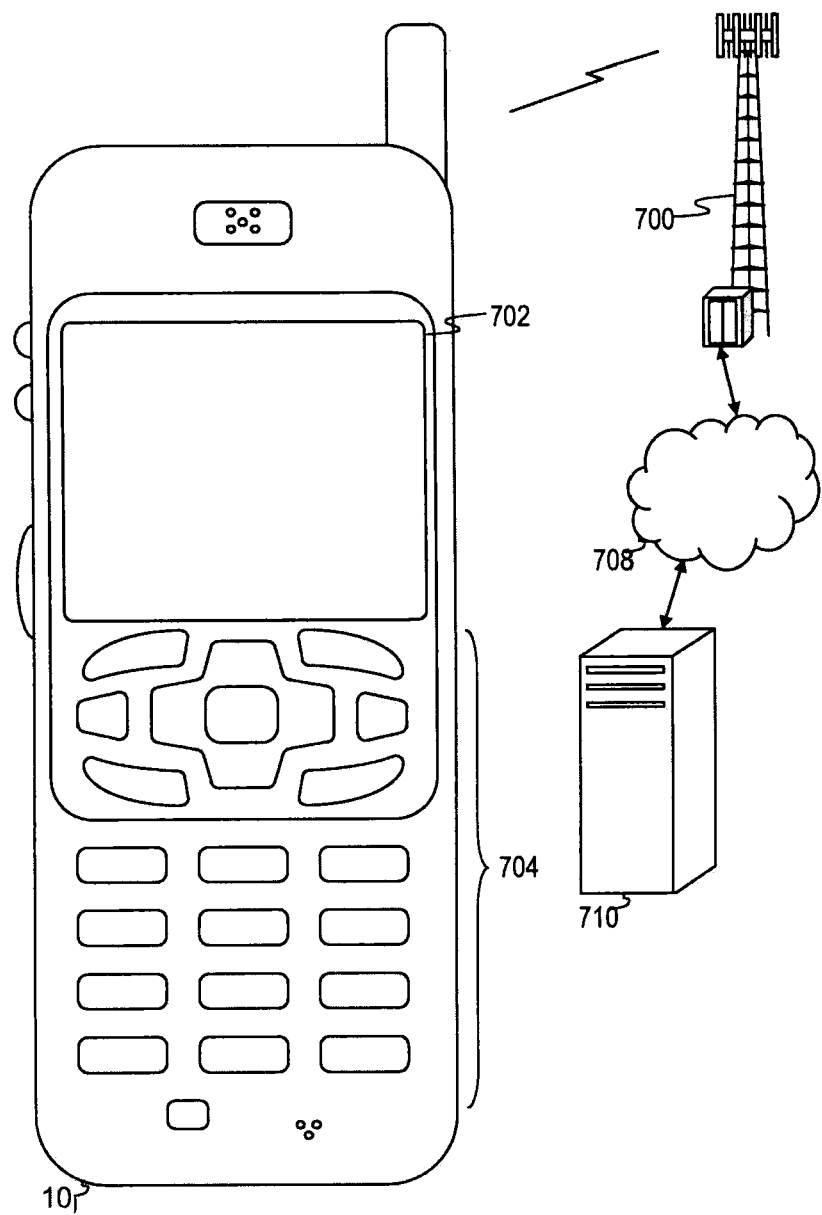
FIG. 11 illustrates a wireless communications system including an embodiment of user equipment.

Referring now to FIG. 11, a wireless communications system including an embodiment of an exemplary UE 10 is illustrated. The UE is operable for implementing aspects of the disclosure, but the disclosure should not be limited to these implementations. Though illustrated as a mobile phone, the UE may take various forms including a wireless handset, a pager, a personal digital assistant (PDA), a portable computer, a tablet computer, a laptop computer, smartphones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred to as 704 for receiving input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 is a web browser, which enables the display 702 to show a web page. The web page may be obtained via wireless communications with a wireless network access node, a cell tower, a peer UE 10, or any other wireless communications network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 12:
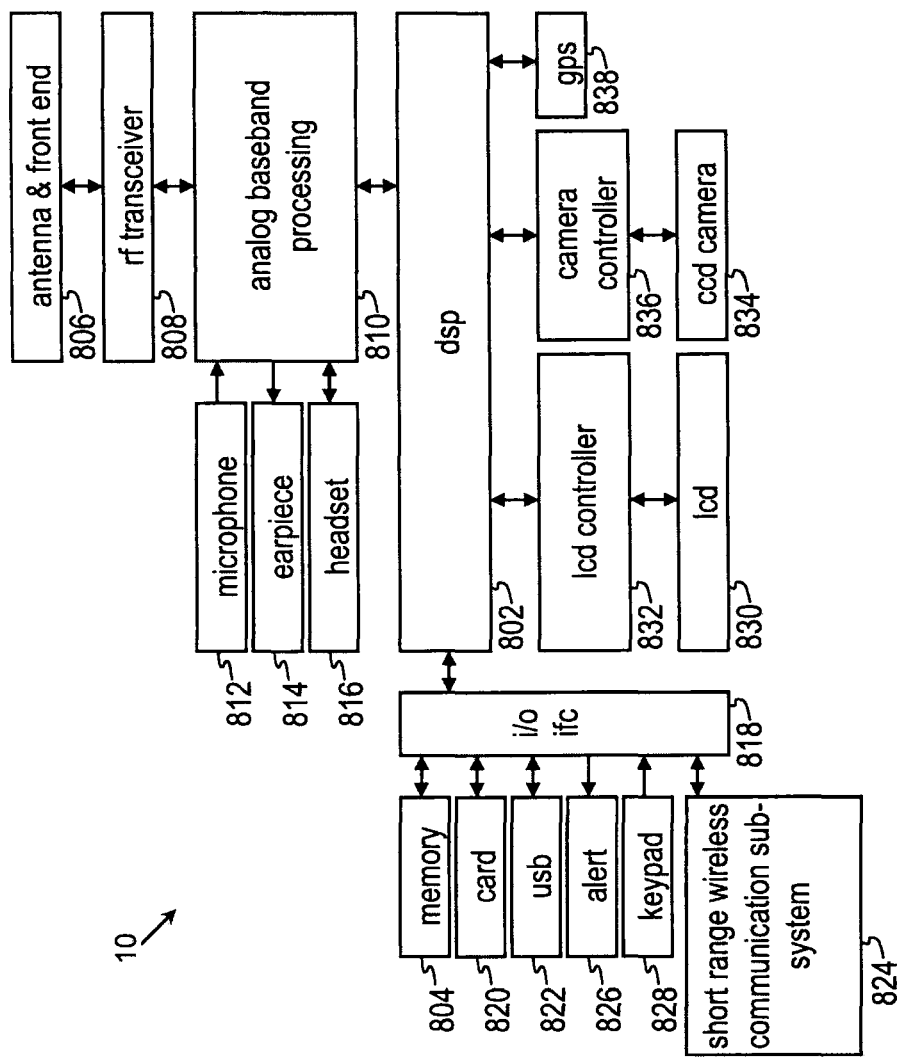
FIG. 12 shows a block diagram of user equipment including a digital signal processor (DSP) and a memory.

FIG. 12 shows a block diagram of the UE 10. While a variety of known components of UE 10 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 13:
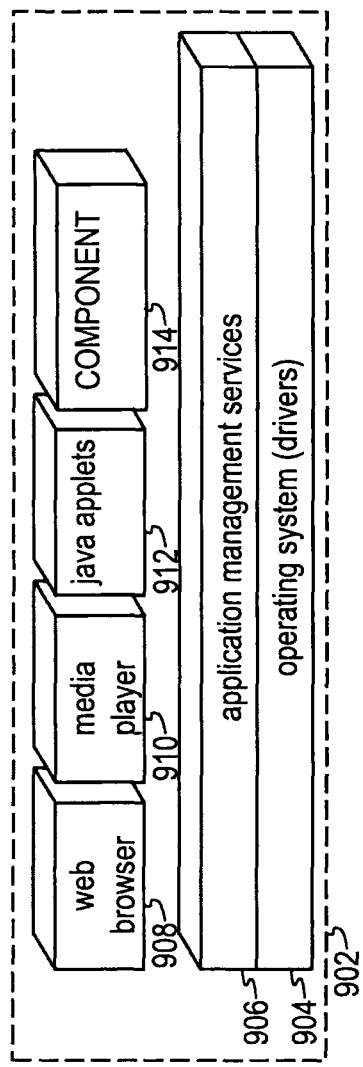
FIG. 13 illustrates a software environment that may be implemented by a processor of user equipment.

FIG. 13 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 13 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audiovisual media. The Java applets 912 configure the UE 10 to provide games, utilities, and other functionality. A component 914 might provide functionality described herein.

Figure 14:
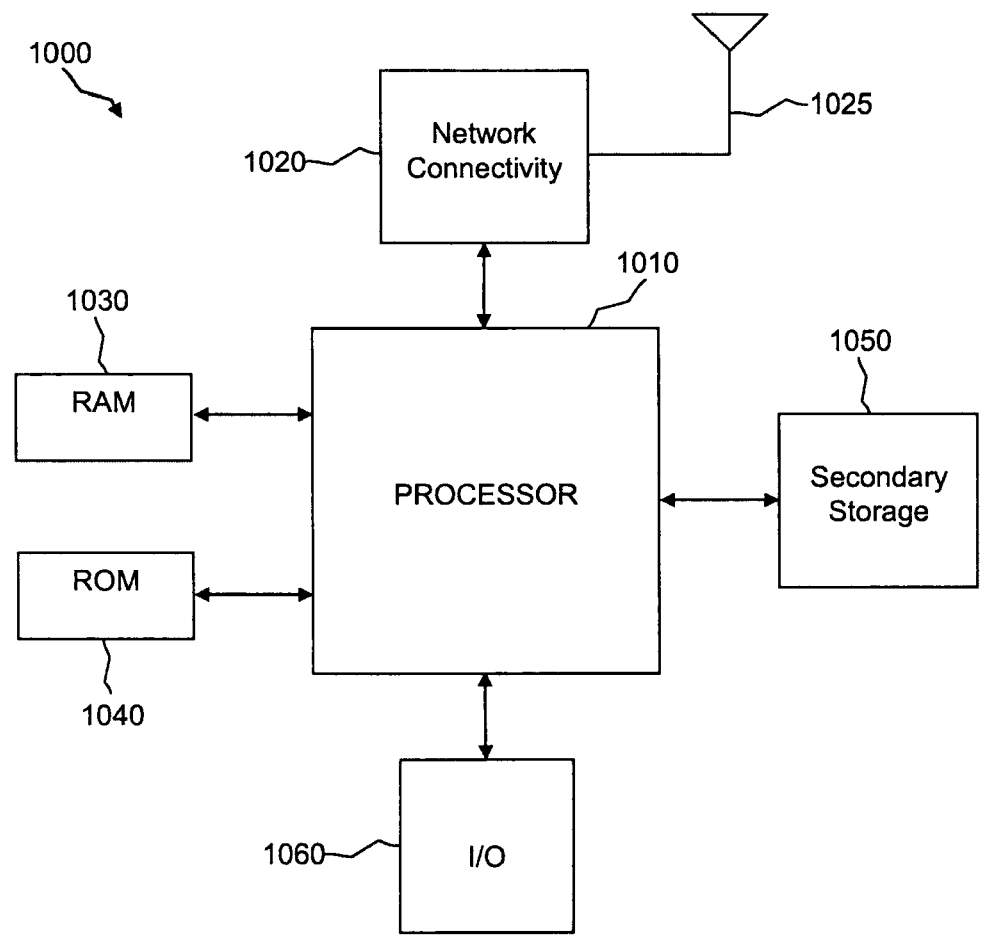
FIG. 14 illustrates an example of a system that includes a processing component suitable for implementing aspects of the present disclosure.

The UE 10, access device 120, and other components described above might include a processing component that is capable of executing instructions related to the actions described above. FIG. 14 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. The various elements or components may be combined or integrated in another system or certain features may be omitted, or not implemented. For example, although the present disclosure uses circuit-switched fallback as an example, the techniques and methods described herein can be more generally applied in situations where UE attempts to access a service not available through a current network cell with which the UE is associated but available through another network cell with which the UE is not currently associated. The service may be unavailable to the UE through the current network cell, for example, if the current network cell does not support the service at all, or if the service is only available through the current network cell under a protocol that is not compatible with the UE's capability. For example, in the situation where the UE attempts to access voice call and an E-UTRAN cell may provide voice call but only through IP services, the service is unavailable through the E-UTRAN cell if the UE only supports circuit-switched voice call. Additionally, the current network cell and the target network cell may or may not be in the same network and may or may not use the same RAT. A network operator may configure network cells in the same radio access network such that a particular service may be provided in some of the network cells but not others. Depending on where the service is provided, the current network cell may direct the UE to a different radio access network using a different RAT, or to a different network cell in the same radio access network.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An access device, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   receiving, at the access device and from a user equipment (UE), a Radio Resource Control (RRC) connection setup complete message, wherein the RRC connection setup complete message includes a Non-Access Stratum (NAS) message comprising a service request;
   in response to the RRC connection setup complete message, forwarding the NAS message to a NAS network node supporting mobility management; and
   receiving, at the access device and from the NAS network node, a message causing a context setup, wherein the message causing the context setup identifies an area that the UE is registered in.

2. The access device of claim 1, the operations further comprising:
   selecting a circuit switched network cell belonging to the area identified by the message causing the context setup; and
   instructing the UE to transfer to the selected circuit switched network cell.

3. The access device of claim 2, wherein the selected circuit switched network cell is a Global System for Mobile Communications (GSM) Enhanced Data rates for GSM Evolution (EDGE) Radio Access Network (GERAN) cell.

4. The access device of claim 1, wherein the message causing the context setup includes an indication that circuit switched fallback has been triggered.

5. The access device of claim 1, the operations further comprising sending a RRC connection reconfiguration message to the UE, wherein the RRC connection reconfiguration message configures the UE to measure at least one circuit switched network cell.

6. The access device of claim 5, the operations further comprising in response to the RRC connection reconfiguration message, receiving a measurement report indicating measurement information of at least one circuit switched network cell.

7. The access device of claim 1, wherein the access device is a Long Term Evolution (LTE) access device.

8. A Non-Access Stratum (NAS) network node, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
   receiving, at the NAS network node and from an access device, a Non-Access Stratum (NAS) message comprising a service request for a user equipment (UE), wherein the NAS network node supports mobility management; and
   sending, from the NAS network node and to the access device, a message causing a context setup, wherein the message causing the context setup identifies an area that the UE is registered in.

9. The NAS network node of claim 8, wherein the message causing the context setup includes an indication that circuit switched fallback has been triggered.

10. The NAS network node of claim 8, wherein the access device is a Long Term Evolution (LTE) access device.

11. A method, comprising:
    receiving, at an access device and from a user equipment (UE), a Radio Resource Control (RRC) connection setup complete message, wherein the RRC connection setup complete message includes a Non-Access Stratum (NAS) message comprising a service request;
    in response to the RRC connection setup complete message, forwarding the NAS message to a NAS network node supporting mobility management; and
    receiving, at the access device and from the NAS network node, a message causing a context setup, wherein the message causing the context setup identifies an area that the UE is registered in.

12. The method of claim 11, further comprising:
    selecting a circuit switched network cell belonging to the area identified by the message causing the context setup; and
    instructing the UE to transfer to the selected circuit switched network cell.

13. The method of claim 12, wherein the selected circuit switched network cell is a Global System for Mobile Communications (GSM) Enhanced Data rates for GSM Evolution (EDGE) Radio Access Network (GERAN) cell.

14. The method of claim 11, wherein the message causing the context setup includes an indication that circuit switched fallback has been triggered.

15. The method of claim 11, further comprising: sending a RRC connection reconfiguration message to the UE, wherein the RRC connection reconfiguration message configures the UE to measure at least one circuit switched network cell.

16. The method of claim 15, further comprising: in response to the RRC connection reconfiguration message, receiving a measurement report indicating measurement information of at least one circuit switched network cell.

17. The method of claim 11, wherein the access device is a Long Term Evolution (LTE) access device.

* * * * *